(12) United States Patent
Suarez

(10) Patent No.: US 12,465,081 B2
(45) Date of Patent: Nov. 11, 2025

(54) INTERNAL STERILIZATION OF AEROSOL-GENERATING DEVICES

(71) Applicant: Altria Client Services LLC, Richmond, VA (US)

(72) Inventor: Christopher J. Suarez, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 564 days.

(21) Appl. No.: 17/835,047

(22) Filed: Jun. 8, 2022

(65) Prior Publication Data

US 2023/0397664 A1    Dec. 14, 2023

(51) Int. Cl.
| | |
|---|---|
| A24F 40/80 | (2020.01) |
| A24F 7/00 | (2006.01) |
| A24F 40/40 | (2020.01) |
| A24F 40/42 | (2020.01) |
| A24F 40/60 | (2020.01) |
| A61L 2/10 | (2006.01) |

(52) U.S. Cl.
CPC ............. *A24F 40/42* (2020.01); *A24F 40/60* (2020.01); *A61L 2/10* (2013.01); *A61L 2202/11* (2013.01); *A61L 2202/121* (2013.01); *A61L 2202/14* (2013.01)

(58) Field of Classification Search
None
See application file for complete search history.

(56) References Cited

U.S. PATENT DOCUMENTS

| | | | |
|---|---|---|---|
| 10,939,706 B2 | 3/2021 | Worm et al. | |
| 11,864,882 B2* | 1/2024 | Rabasco | A61B 5/7282 |
| 2016/0367767 A1* | 12/2016 | Cashman | A61M 11/005 |
| 2016/0374400 A1* | 12/2016 | Monsees | H05B 1/0244 |
| | | | 131/329 |
| 2020/0359684 A1* | 11/2020 | Bruton | A24F 40/30 |

(Continued)

FOREIGN PATENT DOCUMENTS

| | | | |
|---|---|---|---|
| CN | 209202167 U | * | 8/2019 |
| CN | 111616417 A | | 9/2020 |
| CN | 111671167 A | | 9/2020 |

(Continued)

OTHER PUBLICATIONS

English Translation of CN111671167A (Year: 2020).*

(Continued)

*Primary Examiner* — Philip Y Louie
*Assistant Examiner* — Vu P Pham
(74) *Attorney, Agent, or Firm* — Harness, Dickey & Pierce, P.L.C.

(57) ABSTRACT

An aerosol-generating device includes a housing, a lid, a mouthpiece, and at least one UV diode. The housing defines a capsule-receiving cavity. The lid is configured to close the housing. The lid is fixedly coupled by a hinge to the housing at a first point and releasably couplable to the housing at a second point that is different from the first point. The mouthpiece is couplable to the lid opposite the housing such that air entering the housing and drawn through the capsule-receiving cavity exits out of the mouthpiece. The at least one UV diode is configured to sanitize an interior of the aerosol-generating device when the at least one UV diode is actuated.

20 Claims, 14 Drawing Sheets

(56) References Cited

U.S. PATENT DOCUMENTS

2021/0113723 A1\* 4/2021 Malinowski ............. A61L 2/10
2021/0120870 A1 4/2021 Zhu

FOREIGN PATENT DOCUMENTS

| CN | 111820470 A | 10/2020 | | |
|---|---|---|---|---|
| CN | 112335937 A | 2/2021 | | |
| CN | 113142654 A | 7/2021 | | |
| KR | 200469513 Y1 | 10/2013 | | |
| KR | 20160096744 A | 8/2016 | | |
| WO | 2012081804 A2 | 6/2012 | | |
| WO | WO-2016190577 A1 | 12/2016 | | |
| WO | WO-2023025644 A1 \* | 3/2023 | ............. | A24F 40/20 |

OTHER PUBLICATIONS

English Translation of CN209202167U (Year: 2019).\*
IARC Working Group, Solar and Ultraviolet Radiation (Year: 2012).\*
International Preliminary Report on Patentability Corresponding to Application No. PCT/US2023/020955, mailed Dec. 10, 2024.

\* cited by examiner

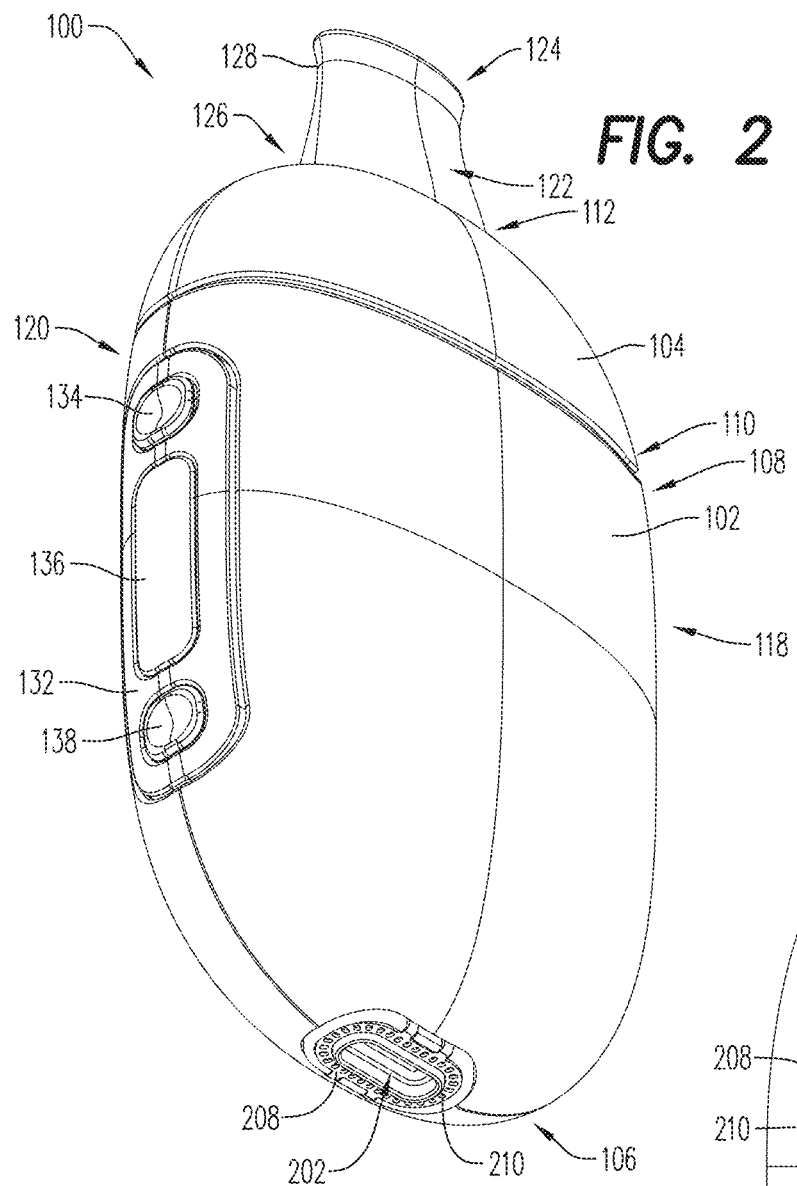
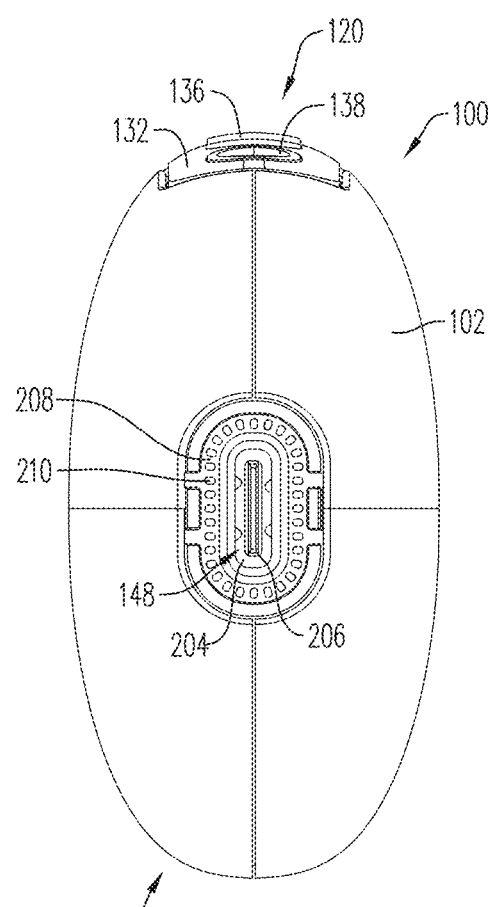
FIG. 2
FIG. 3

INTERNAL STERILIZATION OF AEROSOL-GENERATING DEVICES

TECHNICAL FIELD

At least some example embodiments relate to aerosol-generating devices and more particularly, but without limitation, to internal sterilization of aerosol-generating devices.

BACKGROUND

Some electronic devices are configured to heat a plant material to a temperature that is sufficient to release constituents of the plant material while keeping the temperature below its ignition temperature so as to avoid a self-sustaining burning or a self-sustaining combustion of the plant material (i.e., in contrast to where a plant material is lit, such as lit-end cigarettes). Such devices may be characterized as generating an aerosol of constituents released by heating and may be referred to as heat-not-burn aerosol-generating devices, or heat-not-burn devices.

It is understood that heating of a plant material below its ignition temperature may, in some circumstances, produce incidental and insubstantial levels of oxidized or other thermal decomposition byproducts. However, in some embodiments, the heating in aerosol-generating devices is below the pyrolysis temperature of the plant material so as to produce an aerosol having no or insubstantial levels of thermal decomposition byproducts of the plant material. Thus, in an example embodiment, pyrolysis of the plant material does not occur during the heating and resulting production of aerosol. In other instances, there may be incidental pyrolysis, with production of oxidized or other thermal decomposition byproducts at levels that are insignificant relative to the primary constituents released by heating of the plant materials.

BRIEF SUMMARY

New and useful systems, apparatuses, and methods for aerosol-generating devices are set forth in the appended claims. Illustrative embodiments are also provided to enable a person skilled in the art to make and use the claimed subject matter.

For example, in some example embodiments, an aerosol-generating device can include a housing, a lid, a mouthpiece, and at least one UV diode. The housing can define a capsule-receiving cavity and the lid can be configured to close the housing. The lid can be fixedly coupled by a hinge to the housing at a first point and releasably couplable to the housing at a second point that is different from the first point. The mouthpiece can be couplable to the lid opposite the housing such that air entering the housing and drawn through the capsule-receiving cavity exits out of the mouthpiece. The at least one UV diode can be configured to sanitize an interior of the aerosol-generating device when the at least one UV diode is actuated.

In some example embodiments, the lid can include an inner cavity that is configured to receive the capsule-receiving cavity when the lid is coupled to the housing at the second point. In some example embodiments, the at least one UV diode can be within the inner cavity of the lid. In some example embodiments, the at least one UV diode can be directed towards the housing. The at least one UV diode can be configured to direct UV light towards the housing when the at least one UV diode is actuated. In some example embodiments, the at least one UV diode can be directed towards the mouthpiece. The at least one UV diode can be configured to direct UV light into the mouthpiece when the at least one UV diode is actuated.

In some example embodiments, the at least one UV diode can further include a power contact. The power contact can be configured to contact an electrical connection of the housing when the lid is coupled to the housing at the second point.

In some example embodiments, the mouthpiece can include a first end and a second end opposite the first end. The first end of the mouthpiece can be configured to couple to the lid and the second end of the mouthpiece can include at least one outlet. In some example embodiments, the at least one UV diode can include a UV-C light ring diode around the at least one outlet of the mouthpiece. In some example embodiments, the UV-C light ring diode can be configured to direct UV light into the mouthpiece when the UV-C light ring diode is actuated.

In some example embodiments, the aerosol-generating device can further include a controller within the housing. In some example embodiments, the controller can be configured to actuate the at least one UV diode when the lid is coupled to the housing at the second point and the aerosol-generating device is in a non-use mode. In some example embodiments, the aerosol-generating device can be in the non-use mode when the aerosol-generating device is coupled to a charging station. The at least one UV diode can be configured to turn off if the aerosol-generating device is taken out of the non-use mode. In some embodiments, the at least one UV diode can be configured to operate the at least one UV diode for a predetermined amount of time. The predetermined amount of time can be an amount of time necessary to sanitize the interior of the aerosol-generating device.

In some example embodiments, the aerosol-generating device can further include a communication screen and a power button. The communication screen can be configured to output information related to the at least one UV diode.

In some example embodiments, the at least one UV diode can include a UV-C diode.

In some example embodiments, the at least one UV diode can be configured to emit UV light in a wavelength range of 100 nanometers to 280 nanometers.

Also described herein is a method of sanitizing an interior of an aerosol-generating device. The method can include placing the aerosol-generating device in a non-use mode, actuating at least one UV diode of the aerosol-generating device, and operating the at least one UV diode for a predetermined amount of time. In some example embodiments, placing the aerosol-generating device into the non-use mode comprises can include placing the aerosol-generating device onto a charging station to re-charge the aerosol-generating device. In some example embodiments, the predetermined amount of time can be an amount of time necessary to sanitize the interior of the aerosol-generating device. In some example embodiments the at least one UV diode can be turned off if the aerosol-generating device is taken out of the non-use mode.

Objectives, advantages, and a preferred mode of making and using the claimed subject matter may be understood best by reference to the accompanying drawings in conjunction with the following detailed description of illustrative embodiments.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 2 is a bottom right, front perspective view of the aerosol generating device illustrated in FIG. 1.

FIG. 3 is a bottom view of the aerosol generating device illustrated in FIG. 1.

DESCRIPTION OF EXAMPLE EMBODIMENTS

Figure 1:
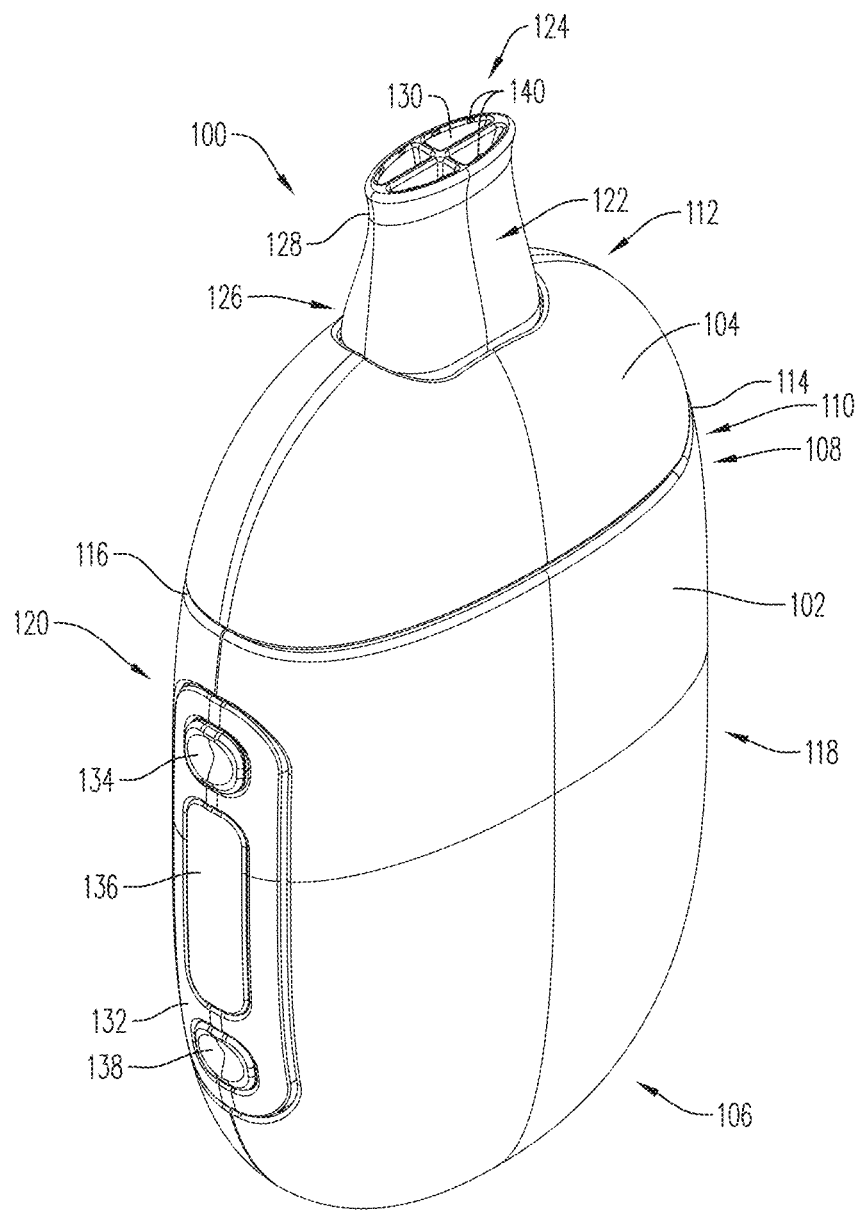
FIG. 1 is a top right, front perspective view of an aerosol generating device in accordance with at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. For example, when an elastic layer and a support layer are removably coupled to one another, the elastic layer and the support layer can be separated upon the application of sufficient force.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

FIGS. 1-11 are illustrations of an aerosol-generating device 100 according to some example embodiments. Referring to FIG. 1, a top perspective view of the aerosol-generating device 100 is shown. In some embodiments, a main body of the aerosol-generating device 100 may have a general oblong or pebble shape. The main body of the aerosol-generating device 100 may include a housing 102 and a lid 104. The housing 102 may have a first end 106 and a second end 108 opposite the first end 106. The lid may have a first end 110 and a second end 112 opposite the first end 110. The first end 110 of the lid 104 may be fixedly coupled to the second end 108 of the housing 102 at a first point 114 and releasably couplable to the second end 108 of the housing 102 at a second point 116. The first point 114 of the housing 102 may be on a first side 118 of the aerosol-generating device 100. The second point 116 of the housing 102 may be on a second side 120 of the aerosol-generating device 100.

In some example embodiments, the aerosol-generating device 100 may further include a mouthpiece 122. In at least some example embodiments, the mouthpiece 122 may include a first end 124 and a second end 126 opposite the first end 124. The second end 126 of the mouthpiece 122 may be coupled to the second end 112 of the lid 104. In some embodiments, the second end 126 of the mouthpiece 122 may be releasably coupled to the second end 112 of the lid 104. In at least one example embodiment, the mouthpiece 122 may be tapered between the first end 124 and the second end 126. For example, the diameter or average length/width dimensions of the first end 124 may be smaller than the diameter or average length/width dimensions of the second end 126. Towards the first end 124, the taper may have a slight inward curvature 128 that is configured to receive the lips of an adult consumer and improve the comfort and experience. In some embodiments, the first end 124 may have an oblong or elliptical shape and may include one or more outlets 130. For example, the first end 124 may include four outlets 130, such that four or more different areas or quadrants of the adult consumer's mouth can be engaged during use of the aerosol-generating device 100. In other embodiments, the mouthpiece 122 may have fewer than four outlets 130 or greater than four outlets 130.

In some example embodiments, the housing 102 may include a consumer interface panel 132 disposed on the second side 120 of the aerosol-generating device 100. For example, the consumer interface panel 132 may be an oval-shaped panel that runs along the second side 120 of the aerosol-generating device 100. The consumer interface panel 132 may include a latch release button 134, as well as a communication screen 136 and/or a power button 138. For example, in at least some example embodiments, the consumer interface panel 132 may include the communication screen 136 disposed between the latch release button 134 and the power button 138. As illustrated, the latch release button 134 may be disposed towards the second end 108 of the aerosol-generating device 100, and the power button 138 may be disposed towards the first end 106 of the aerosol-generating device 100. The latch release button 134 and the power button 138 may be adult consumer interaction buttons. The latch release button 134 and the power button 138 may have a substantially circular shape with a center depression or dimple configured to direct the pressure applied by the adult consumer, although example embodiments are not limited thereto. The power button 138 may turn on and off the aerosol-generating device 100. Though only the two buttons are illustrated, it should be understood more or less buttons may be provided depending on the available features and desired adult consumer interface.

In at least one example embodiment, the communication screen 136 may be an integrated thin-film transistor ("TFT") screen. In other example embodiments, the communication screen 136 is an organic light emitting diode ("OLED") or light emitting diode ("LED") screen. The communication screen 136 is configured for adult consumer engagement and may have a generally oblong shape.

In some example embodiments, the first end 124 of the mouthpiece 122 may further include at least one UV light diode 140. As shown in FIG. 1, the mouthpiece 122 may include a plurality of UV light diodes 140 disposed within or around the four outlets 130. The plurality of UV light diodes 140 may be a UV light ring diode in some embodiments. More specifically, the plurality of UV light diodes 140 may be UV-C light ring diode or a UV-C flex diode in some embodiments. In other embodiments, the plurality of UV light diodes 140 may be UV-C diodes. The plurality of UV light diodes 140 may be configured to emit UV light in a wavelength range of 100 nanometers to 280 nanometers. The plurality of UV light diodes 140 may be configured to direct UV light into the mouthpiece 122 when the plurality of UV light diodes 140 are actuated. In some embodiments, the communication screen 136 may be configured to output information about the at least one UV light diode 140.

In some embodiments, an exterior of the housing 102 and/or the lid 104 may be formed from a metal (such as aluminum, stainless steel, and the like); an aesthetic, food contact rated plastic (such as, a polycarbonate (PC), acrylonitrile butadiene styrene (ABS) material, liquid crystalline polymer (LCP), a copolyester plastic, or any other suitable polymer and/or plastic); or any combination thereof. The mouthpiece 122 may be similarly formed from a metal (such as aluminum, stainless steel, and the like); an aesthetic, food contact rated plastic (such as, a polycarbonate (PC), acrylonitrile butadiene styrene (ABS) material, liquid crystalline polymer (LCP), a copolyester plastic, or any other suitable polymer and/or plastic); and/or plant-based materials (such as wood, bamboo, and the like). One or more interior surfaces or the housing 102 and/or lid 104 may be formed from or coated with a high temperature plastic (such as, polyetheretherketone (PEEK), liquid crystal polymer (LCP), or the like).

Referring to FIGS. 2 and 3, a bottom perspective view of the aerosol-generating device 100, and a bottom-up view of the aerosol-generating device 100 of FIG. 1 are shown. In some embodiments, the housing 102 may further include a charging connector or port 202. For example, the port 202 may be defined/disposed in a first end 106 of the housing 102. The port 202 may be configured to receive an electric current (e.g., via a USB/mini-USB cable) from an external power source to charge a power source internal to the aerosol-generating device 100. For example, in at least one example embodiment, the port 202 may be an assembly defining a cavity 204 that has a projection 206 within the cavity 204. In an example embodiment, the projection 206 does not extend beyond the rim of the cavity 204. In addition, the port 202 may also be configured to send data to and/or receive data (e.g., via a USB/mini-USB cable) from another aerosol generating device (e.g., heat not-burn (HNB) aerosol generating device) and/or other electronic device (e.g., phone, tablet, computer, and the like). In at least one embodiment, the aerosol-generating device 100 may instead or additionally be configured for wireless communication (e.g., via Bluetooth) with such other aerosol generating devices and/or electronic devices.

In at least some example embodiments, a protective grille 208 is disposed around the port 202. The protective grille 208 may be configured to help reduce or prevent debris ingress and/or the inadvertent blockage of the incoming airflow. For example, the protective grille 208 may define a plurality of pores 210 along its length or course. As illustrated, the protective grille 208 may have an annular form that surrounds the port 202. In this regard, the plurality of pores 210 may also be arranged (e.g., in a serial arrangement) around the port 202. Each of the plurality of pores 210 may have an oval or circular shape, although not limited thereto. In at least one example embodiment, the protective grille 208 may include an approved food contact material. For example, the protective grille 208 may include plastic, metal (e.g., stainless steel, aluminum), or a combination thereof. In at least some example embodiments, a surface of the protective grille 208 may be coated, for example with a thin layer of plastic, and/or anodized.

The plurality of pores 210 in the protective grille 208 may function as inlets for air drawn into the aerosol-generating device 100. During the operation of the aerosol-generating device 100, ambient air entering through the plurality of pores 210 in the protective grille 208 around the port 202 will converge to form a combined flow that then travels through the aerosol-generating device 100. More specifically, air may be drawn through the plurality of pores 210 in the protective grille 208 around the port 202, through the aerosol-generating device 100, and out of the mouthpiece 122.

Figure 4:
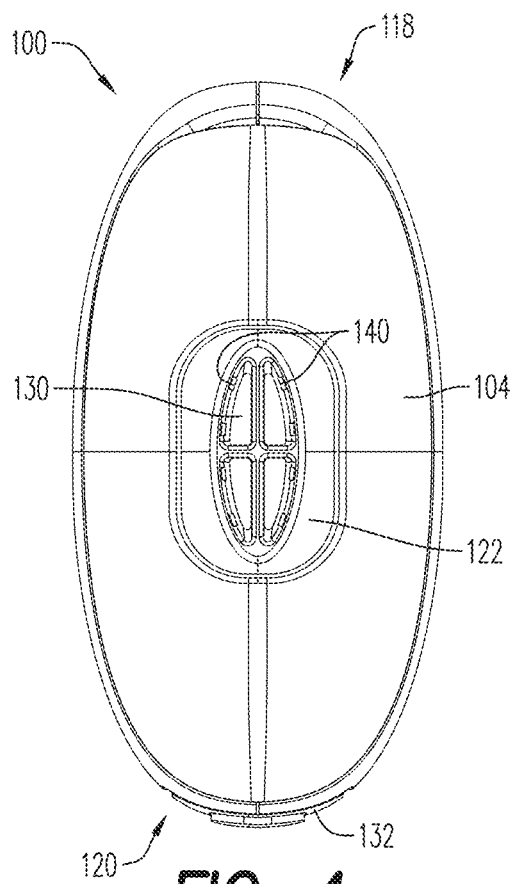
FIG. 4 is a top view of the aerosol generating device illustrated in FIG. 1.

FIG. 4 shows a top-down view of the aerosol-generating device 100 of FIG. 1-3. The UV light diodes 140 may be disposed around the four outlets 130 of the mouthpiece 122. The UV light diodes 140 may be coupled to the mouthpiece 122 by an adhesive, a weld, or another method or means of securing the UV light diodes 140 in place at the mouthpiece 122. In some embodiments, the UV light diodes 140 may be connected via a wire 402. The wire 402 may provide communication between each of the UV light diodes 140 and the housing 102 of the aerosol-generating device 100.

Figure 5:
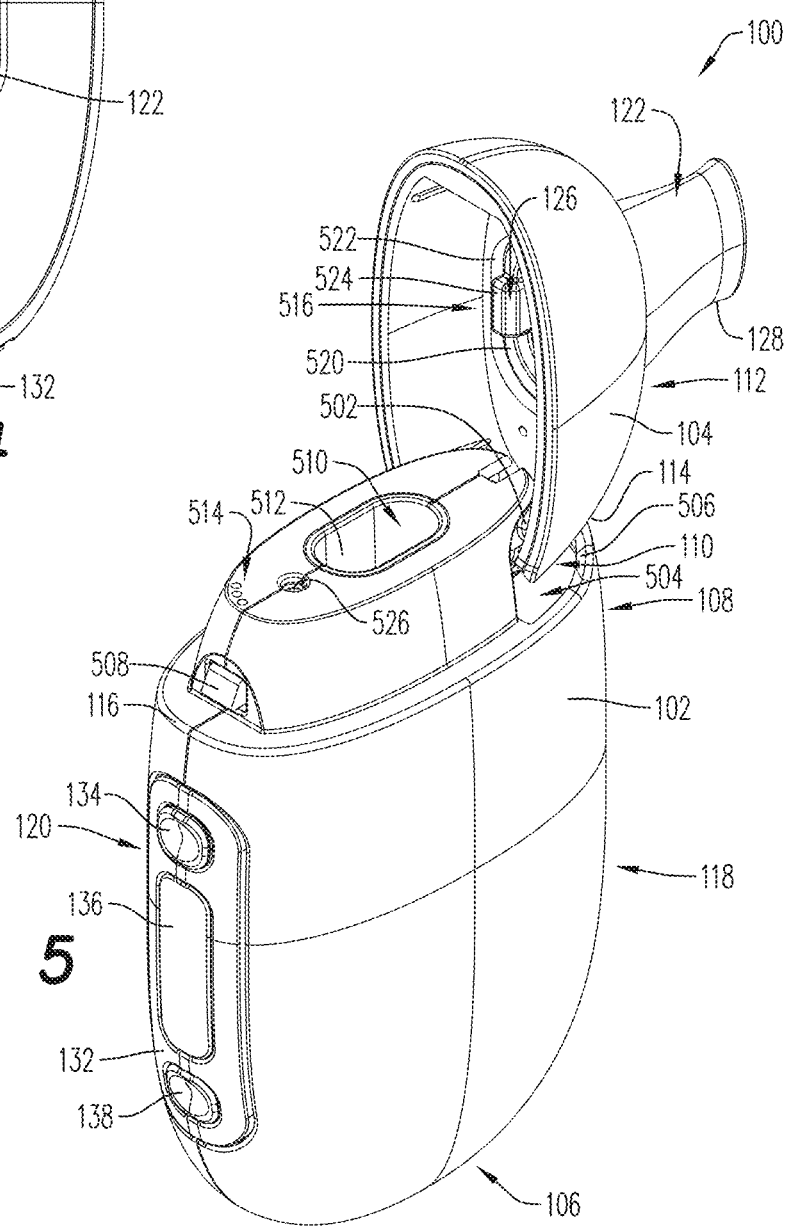
FIG. 5 is a top right, front perspective view of the aerosol generating device illustrated in FIG. 1, where the lid is opened.
Figure 6:
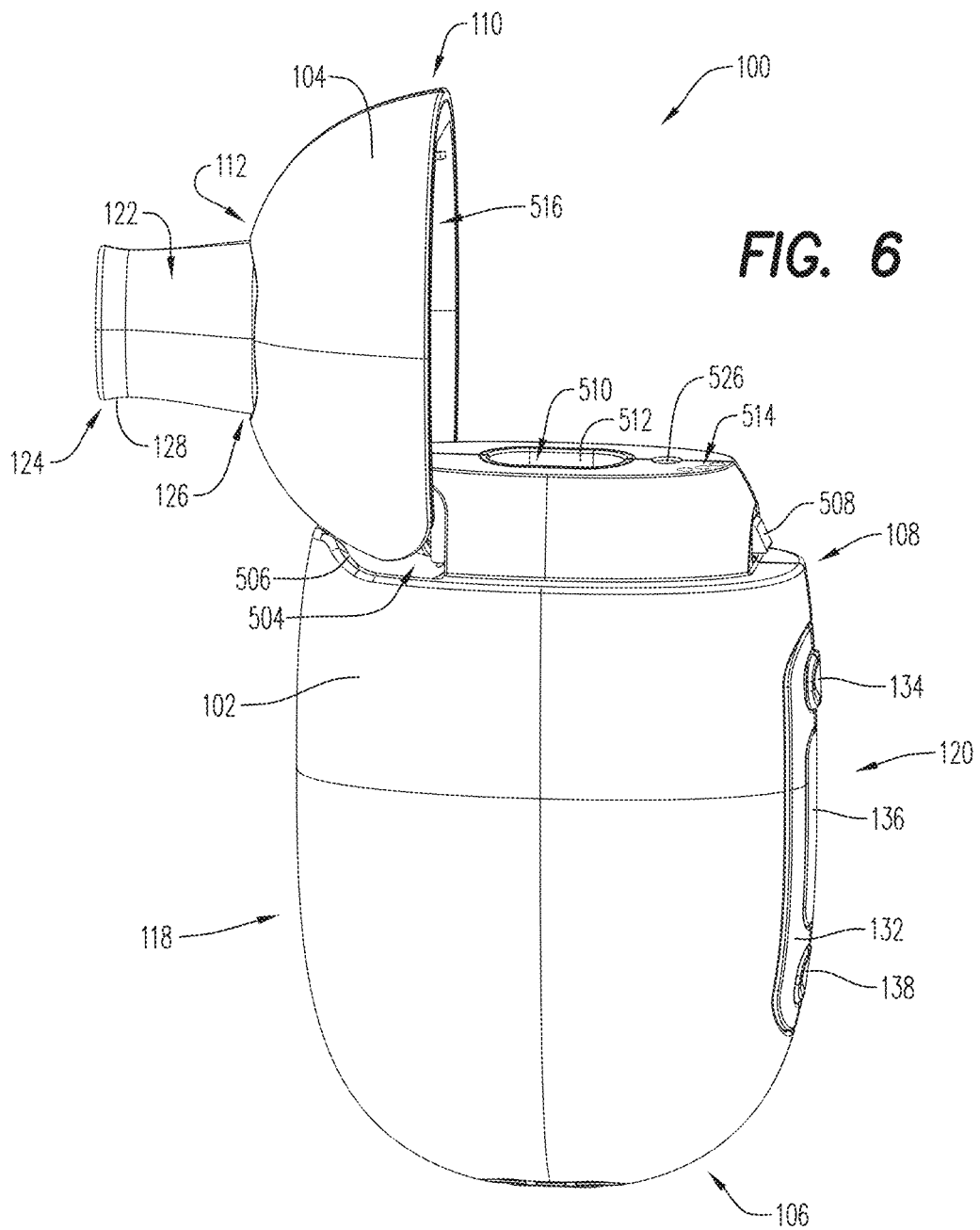
FIG. 6 is a rear perspective view of the aerosol generating device illustrated in FIG. 5.

FIGS. 5 and 6 show different top perspective view of the aerosol-generating device 100 with the lid 104 in an open configuration. The lid 104 may be fixedly coupled to the housing 102 at the first point 114 by a hinge 502, or other similar connector, that allows the lid 104 to move (e.g., swing and rotate) from an open position to a closed position. In some embodiments, the hinge 502 may be a torsion spring. In at least some example embodiments, the housing 102 may include a recess 504 at the first point 114. The recess 504 may be configured to receive a portion of the lid 104 so as to allow for an easy and smooth movement of the lid 104 from the open position to the closed position (and vice versa). The recess 504 may have a structure that corresponds with a relative portion of the lid 104. For example, as illustrated, the recess 504 may include a substantially curved portion 506 that has a general concave shape that corresponds with the curvature of the lid 104, which has a general convex shape.

The lid 104 may be releasably couplable to the housing 102 at the second point 116 by a latch 508, or other similar connector, that allows the lid 104 to be fixed or secured in the closed position and easily releasable to allow the lid 104 to move from the closed position to the open position. In at least one example embodiment, the latch 508 may be coupled to a latch release mechanism disposed within the housing. The latch release mechanism may be configured to move the latch 508 from a first or closed position to a second or open position.

When the lid 104 is in the open position as shown in FIG. 5, a capsule receiving cavity 510 of the housing 102 is exposed. A capsule connector 512 may define the capsule receiving cavity 510 of the housing 102. In some embodiments, the capsule connector 512 may be mounted or otherwise secured to a printed circuit board (PCB) within the housing 102.

In some embodiments, the housing 102 may further include at least one communication point 514. The at least one communication point 514 may be a power contact point or a communication point that may be configured to interact with the at least one UV light diode 140 when the lid 104 is in the closed position. The at least one communication point, power contact point, or communication point are electrical contacts, and these terms are used interchangeably throughout the specification. In some embodiments, at least one of the at least one communication points 514 may be a sensor that may be configured to sense when the lid 104 is in the closed position. In some embodiments, the at least one UV light diode 140 may be actuated when the at least one communication point 514 senses that the lid 104 is in the closed position. As shown in FIG. 5, the at least one communication point 514 may be more than one communication point such as three communication points. For example, in embodiments where the at least one communication point 514 is three communications points, one of the communication points may be a positive power electrode that may be configured to provide power between the housing 102 and the lid 104. Another of the communication points may be a negative power electrode that may be configured to work with the positive power electrode to provide power between the housing 102 and the lid 104. The last of the communication points may be a logic current line that may be configured to facilitation communication between the housing 102 and the lid 104.

In some embodiments, the logic current line may be a closure switch that may prevent the at least one UV light diode 140 from actuating when the lid 104 is in the open position relative to the housing 102. The logic current line may further control the current that is output from the housing 104 to the at least one UV light diode 140. The logic current line may be configured to control the operation of the at least one UV light diode 140. For example, the logic current line may be configured to operate the at least one UV light diode for different amounts and/or at different wavelengths based on communication from the printed circuit board of the housing 104. In some embodiments, the logic current line may further be configured to facilitate communication of overall performance of the at least one UV light diode 140 between the at least one UV light diode 140 and the printed circuit board of the housing 104. For example, the printed circuit board may be configured to send a maximum amount of current to the at least one UV light diode 140 through the logic current line. Based on the current that is received through the logic current line or one of the other communication points 514, the printed circuit board may be configured to determine an overall performance of the at least one UV light diode 140. If the at least one UV light diode 140 is not operating as expected, a message may be output from the aerosol-generating device 100 that may notify a user of the overall performance of the at least one UV light diode. In some embodiments, the printed circuit board may include a logic chip that may enable the printed circuit board to communicate with the at least one UV light diode 140 through the logic current line.

The lid 104 may include an inner cavity 516 that may be adapted to receive the housing 102 when the lid is in the closed position. In some embodiments, the inner cavity 516 of the lid 104 may include an impingement or engagement member or a surface 520 configured to engage a capsule when the lid 104 is pivoted to transition to the closed position. The surface 520 of the lid 104 may include a recess that may correspond to the size and shape of the capsule and/or a resilient material to enhance an interface with the capsule to provide the desired seal. In some embodiments, the lid 104 may further include an opening 522 that may be adapted to receive the second end 126 of the mouthpiece 122. The mouthpiece 122 may include at least one extension 524 that may be received by the opening 522 of the lid 104 to secure the mouthpiece 122 to the lid 104. In some embodiments, the lid 104 may further include a projection that may be configured to couple with a recess 526 of the housing 102. The projection may fit within the recess 526 when the lid 104 is coupled to the housing 102 in the closed position.

Figure 7:
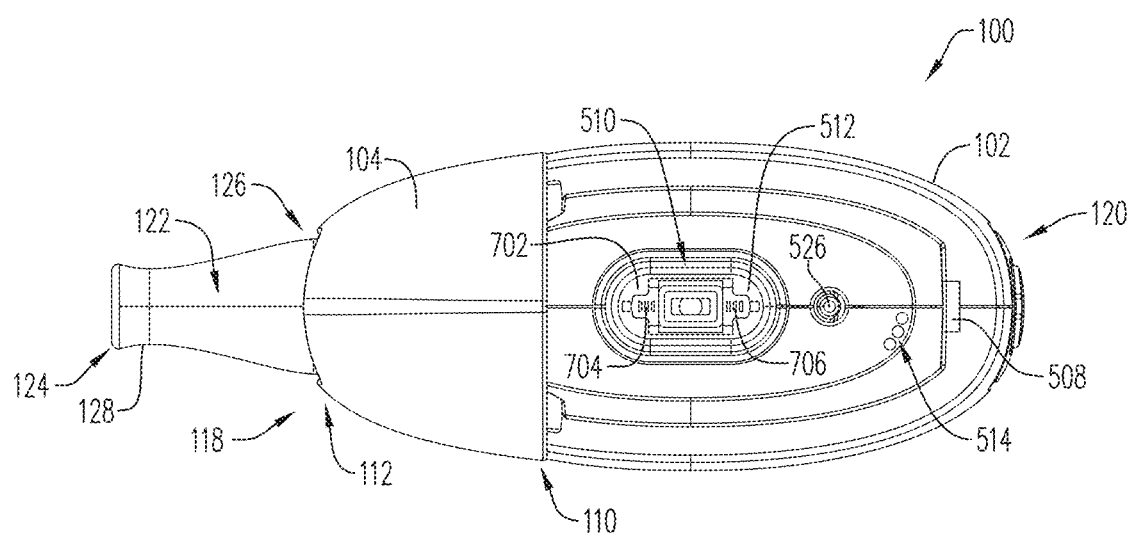
FIG. 7 is a top-down view of the aerosol generating device illustrated in FIG. 5.

Referring to FIG. 7, a top-down view of the aerosol-generating device 100 with the lid 104 in an open configuration is shown. The capsule receiving cavity 510 may have a base 702 that may be inside the housing 102. In some embodiments, the base 702 may include a first contact point 704 and a second contact point 706. The first contact point 704 and the second contact point 706 may be configured to couple to contact points of a capsule that can be received by the capsule receiving cavity 510.

Figure 8:
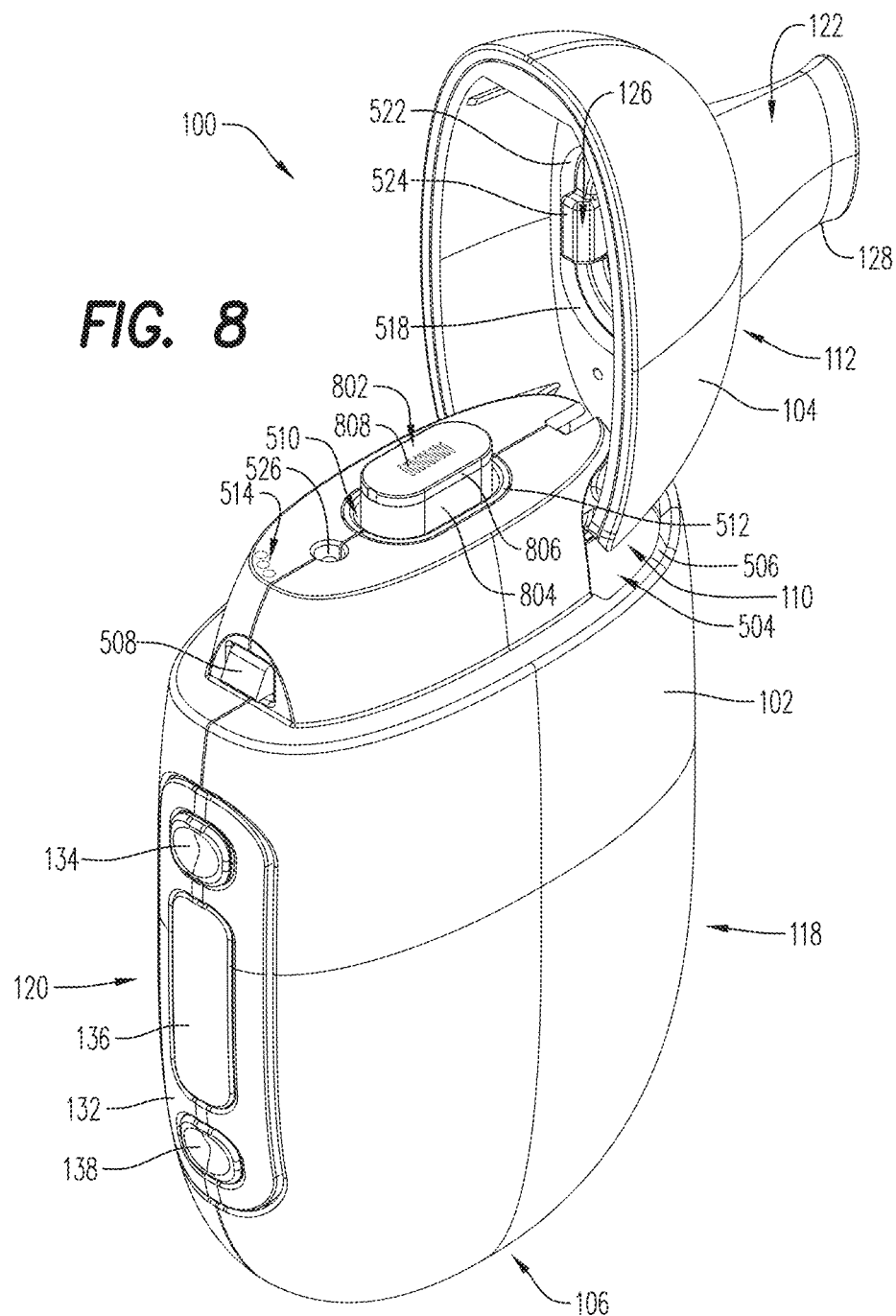
FIG. 8 is a top right, front perspective view of the aerosol generating device illustrated in FIG. 5, including a capsule.

Referring to FIG. 8, a top perspective view of the aerosol-generating device 100 is shown. A capsule 802 may be received by the capsule receiving cavity 510. In some embodiments, not pictured herein, there may be a gasket disposed around the capsule 802 to help secure the capsule 802 in place within the housing 102. The capsule 802 may include a housing 804 configured to contain an aerosol-forming substrate and a heater. In some embodiments, the housing 804 may be in the form of a cover such as a shell or a box sleeve. In some embodiments, the housing 804 can include a first end cap 806 and a second end cap. The second end cap may be opposite the first end cap 806 such that is disposed within the housing 102 when the capsule 802 is received by the capsule receiving cavity 510.

The first end cap 806 can include a first opening 808. In some embodiments, the first opening 808 may be a series of openings disposed through the first end cap 806. Similarly, the second end cap can include a second opening that may be a series of openings in some embodiments. In some embodiments, the first end cap 806 and/or the second end cap may be transparent so as to serve as windows configured to permit a viewing of the contents/components (e.g., aerosol-forming substrate and/or heater) within the capsule 802.

When the capsule 802 is inserted into the capsule receiving cavity 510, the weight of the capsule 802 itself may not be sufficient to compress the first contact point 704 and the second contact point 706. As a result, the capsule 802 may simply rest on exposed pins of the first contact point 704 and the second contact point 706 without any compression (or without any significant compression) of electrical contacts of the first contact point 704 and the second contact point 706. Additionally, the weight of the lid 104 itself, when pivoted to transition to a closed position, may not compress the electrical contacts of the first contact point 704 and the second contact point 706 to any significant degree and, instead, may simply rest on the capsule 802 in an intermediate, partially open/closed position. In such an instance, a deliberate action (e.g., downward force) to close the lid 104 will cause the surface 520 of the lid 104 to press down onto the capsule 802 to provide the desired seal and also cause the capsule 802 to compress and, thus, fully engage the electrical contacts of the first contact point 704 and the second contact point 706. Additionally, a full closure of the lid 104 may result in an engagement with the latch 508, which may maintain the closed position and the desired mechanical/electrical engagements involving the capsule 802 until released (e.g., via the latch release button 134). The force requirement for closing the lid 104 may help to ensure and/or improve air/aerosol sealing and to provide a more robust electrical connection, as well as improved device and thermal efficiency and battery life by reducing or eliminating early power draws and/or parasitic heating of the capsule 802.

Figure 9:
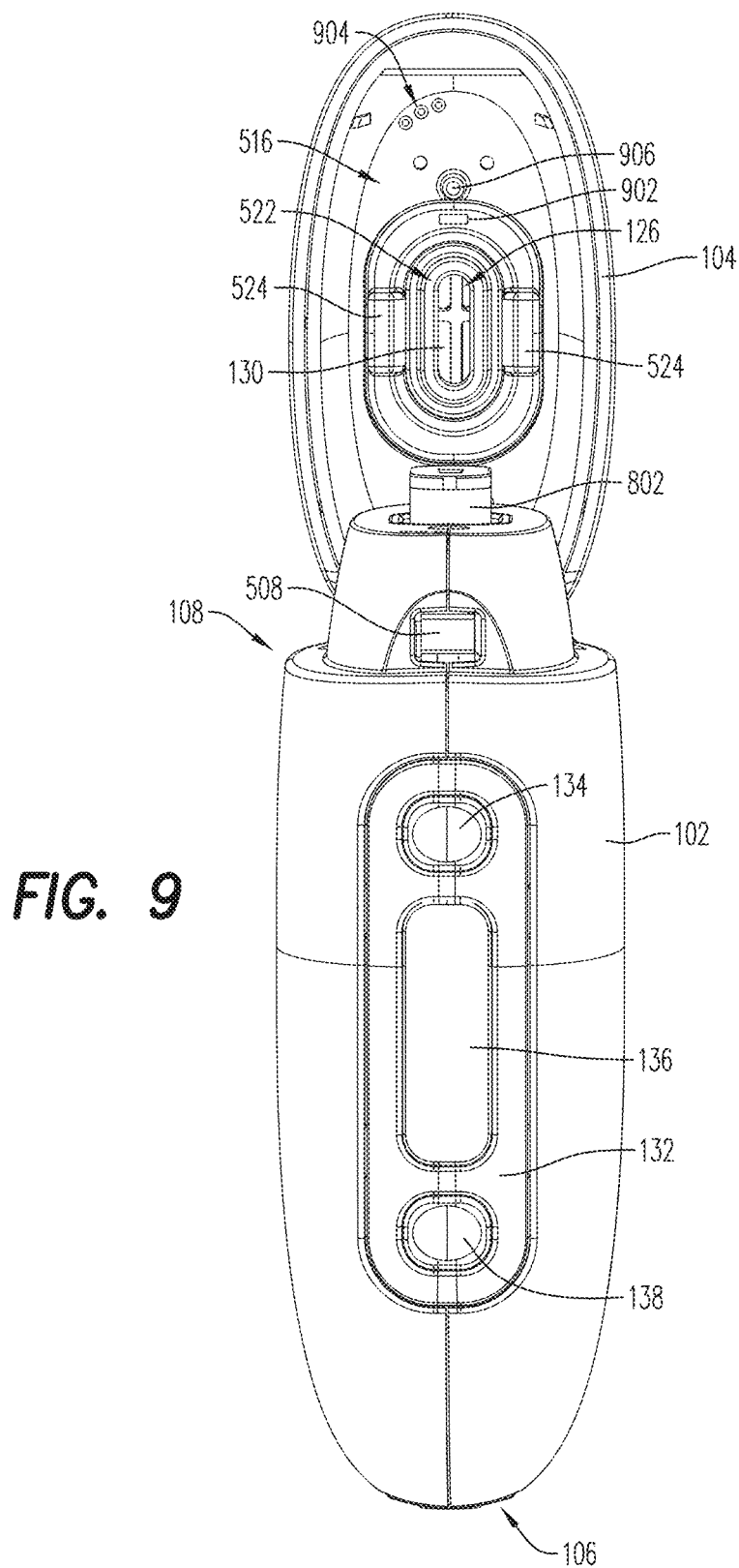
FIG. 9 is a side view of the aerosol generating device illustrated in FIG. 5.

Referring to FIG. 9, a side view of the aerosol-generating device 100 with the lid 104 in an open configuration is shown. The at least one UV light diode 140 may be visible through the one or more outlets 130 of the mouthpiece. In some embodiments, the at least one UV light diode 140 may be a first UV light diode. A second UV light diode 902 may be disposed within the inner cavity 516 of the lid 104. Similar to the at least one UV light diode 140, the second UV light diode 902 may be a UV-C diode. In some embodiments, the second UV light diode 902 may be configured to emit UV light in a wavelength range of 100 nanometers to 280 nanometers. The second UV light diode 902 may be configured to deliver UV light towards an interior of the housing 102 such as the capsule receiving cavity 510 and any gaskets surrounding the capsule receiving cavity 510 when the lid 104 is in the closed position. More specifically, the second UV light diode 902 may be configured to sanitize an interior of the housing 102 when the lid 104 is coupled to the housing 102 in the closed position and when the second UV light diode 902 is actuated.

At least one contact point 904 may be disposed within the inner cavity 516 of the lid 104. The at least one contact point 904 may be configured to couple to the at least one communication point 514 of the housing 102. In some embodiments, the at least one contact point 904 may be a copper disk contact point and the at least one communication point 514 may be a copper spring loaded contact. In other embodiments, the at least one contact point 904 may be a copper spring loaded contact and the at least one communication point 514 may be a copper disk contact point. In either of the above-described configurations, the copper disk contact point may couple with the copper spring loaded contact to communicatively couple the lid 104 and the housing 102. The at least one contact point 904 and the at least one communication point 514 may provide communication between the lid 104 and the housing 102. In some embodiments, the at least one contact point 904 may be more than one contact point such as three contact points. In embodiments with three contact points, each of the three contact points may align with one of the at least one communication points 514. For example, two of the three contact points may couple with the positive power electrode and the negative power electrode to provide power between the housing 102 and the lid 104. The final contact point may couple with the logic current line to facilitate communication between the at least one UV light diode 140 and the second UV light diode 902 with the electronic components of the housing 102 such as the printed circuit board. In some embodiments, the at least one contact points 904 may be coupled to one or both of the at least one UV light diode 140 and the second UV light diode 902.

A projection 906, similar to the projection described above with reference to Figure may be disposed proximate to the second UV light diode 902. The projection 906 may be received by the recess 526 when the lid 104 is coupled to the housing 102 in the closed position.

Figure 10:
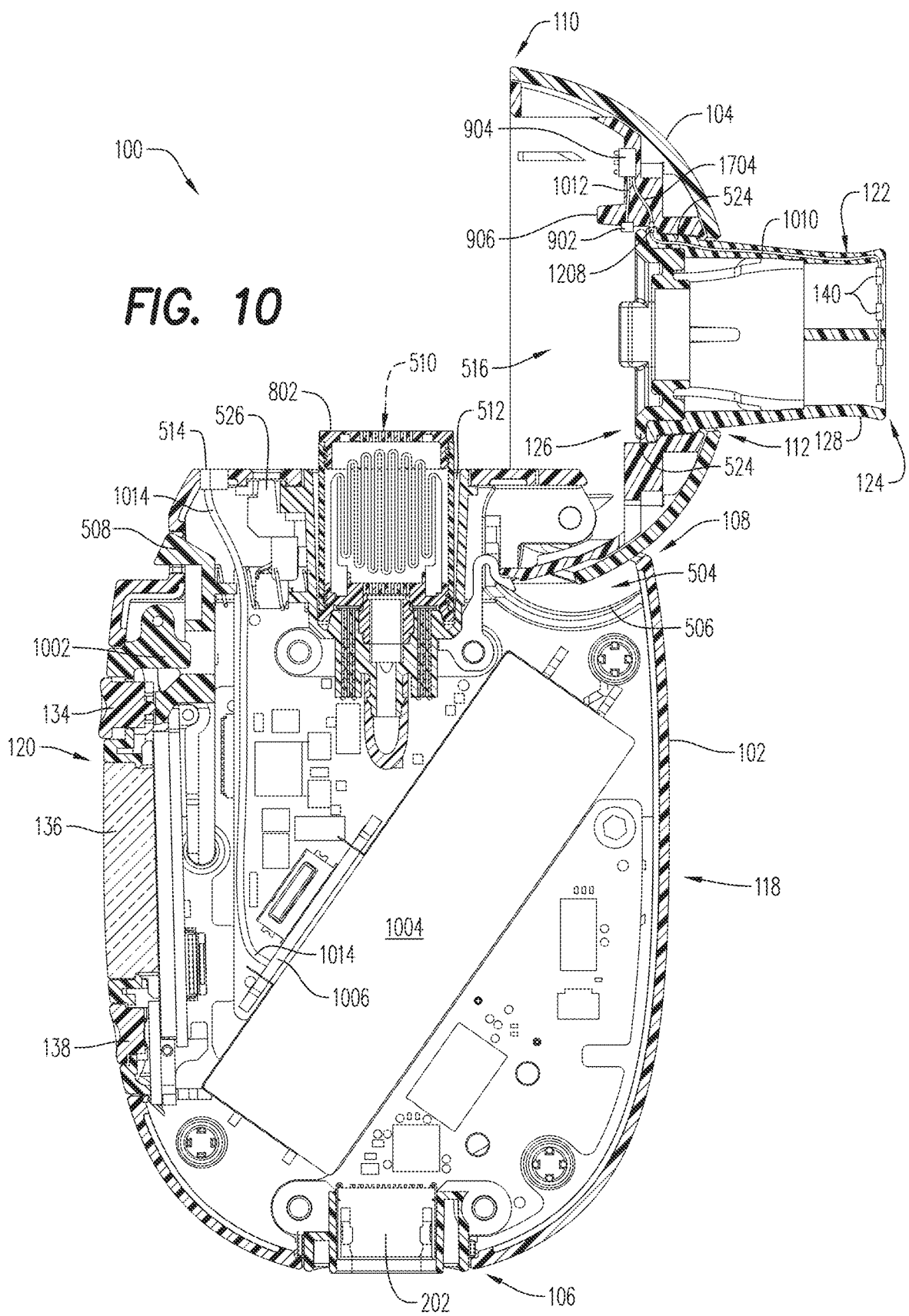
FIG. 10 is a cross-sectional view of the aerosol-generating device illustrated in FIG. 8.

Referring to FIG. 10, a cross-sectional view of the aerosol-generating device 100, where the lid 104 is opened and the capsule 802 is received by the housing 102 is shown. In some example embodiments, the housing 102 encases or houses a latch release mechanism 1002, as well as a power source 1004 and a processing or control circuitry such as a controller 1006. The latch release mechanism 1002 may be in communication with the latch release button 134. The latch release button 134 may be configured to activate the latch release mechanism 1002—i.e., to move the latch 508 from the first or closed or secured position to the second or pressure applying position and to move/return the latch 508 from the open position to the secured or closed position. As described above with reference to FIG. 1, the latch release button 134 may be an adult consumer interaction button disposed on the second side 120 of the aerosol-generating device 100. For example, when the latch release button 134 is pressed by the adult consumer, the latch release mechanism 1002 may move from the first or closed or secured position to the second or pressure applying position so as to move the latch 508 from the secured or closed position to the open position. The latch release button 134 may have a substantially circular shape with a center depression or dimple configured to direct the pressure applied by the adult consumer, although example embodiments are not limited thereto. One or more sensors (not shown) configured to detect the lid 104 opening and closure may be embedded or otherwise disposed within the housing 102 and/or one or more of the elements therein (e.g., the latch 508, the latch release mechanism 1002, the latch release button 134).

The controller 1006 may be hardware including logic circuits; a hardware/software combination such as a processor executing software; or a combination thereof. For example, the controller 1006 may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The controller 1006 may be configured to actuate the at least one UV light diode 140 and the second UV light diode 902 when the lid 104 is coupled to the housing 102 in the closed position. In some embodiments, the controller 1006 may be configured to modify the wavelength of light delivered by the at least one UV light diode 140 and the second UV light diode 902 depending on the sterilization that is desired. The supply of current from the power source 1004 may be in response to a manual operation (e.g., button activation) or an automatic operation (e.g., puff-activation). The power source 1004 may include one or more batteries (e.g., rechargeable dual battery arrangement, lithium-ion battery, and/or fuel cells). In at least some example embodiments, the controller 1006 may further include a haptic motor that may be disposed on a side of the power source 1004.

In some embodiments, there may be at least one wire such as a first wire 1010 that may couple the at least one UV light diode 140 of the mouthpiece 122 to the lid 104. In some embodiments, there may be a contact point on the second end 126 of the mouthpiece 122 that may couple the at least one UV light diode 140 to the lid 104. The contact point on the second end 126 of the mouthpiece 122 may be coupled to the at least one contact point 904 of the lid 104 to provide communication between the mouthpiece 122 and the lid 104. In some embodiments, the second UV light diode 902 may also be coupled to the contact point on the second end 126 of the mouthpiece 122. In other embodiments, there may be a second wire 1012 that couples the second UV light diode 902 with the at least one contact point 904. There may be a third wire 1014 that may couple the at least one communication point 514 of the housing with the controller 1006. In some embodiments, the first wire 1010, the second wire 1012, and the third wire 1014 may all be flat wires that have a minimal profile and can be disposed within the mouthpiece 122, the lid 104, and the housing 102, respectively. The first wire 1010, the second wire 1012, and the third wire 1014 may all be configured to provide communication between the at least one UV light diode 140, the second UV light diode 902, and the controller 1006. In some embodiments, the at least one UV light diode 140 and the UV light diode 902 may have a voltage of about 6.5 volts to about 7.2 volts with a current of about 5 milliamps to about 30 milliamps. Each of the first wire 1010, the second wire 1012, and the third wire 1014 may have a wire gauge of about 37 American Wire Gauge (AWG) to about 38 AWG to operate the UV diodes 138 as intended.

Figure 11:
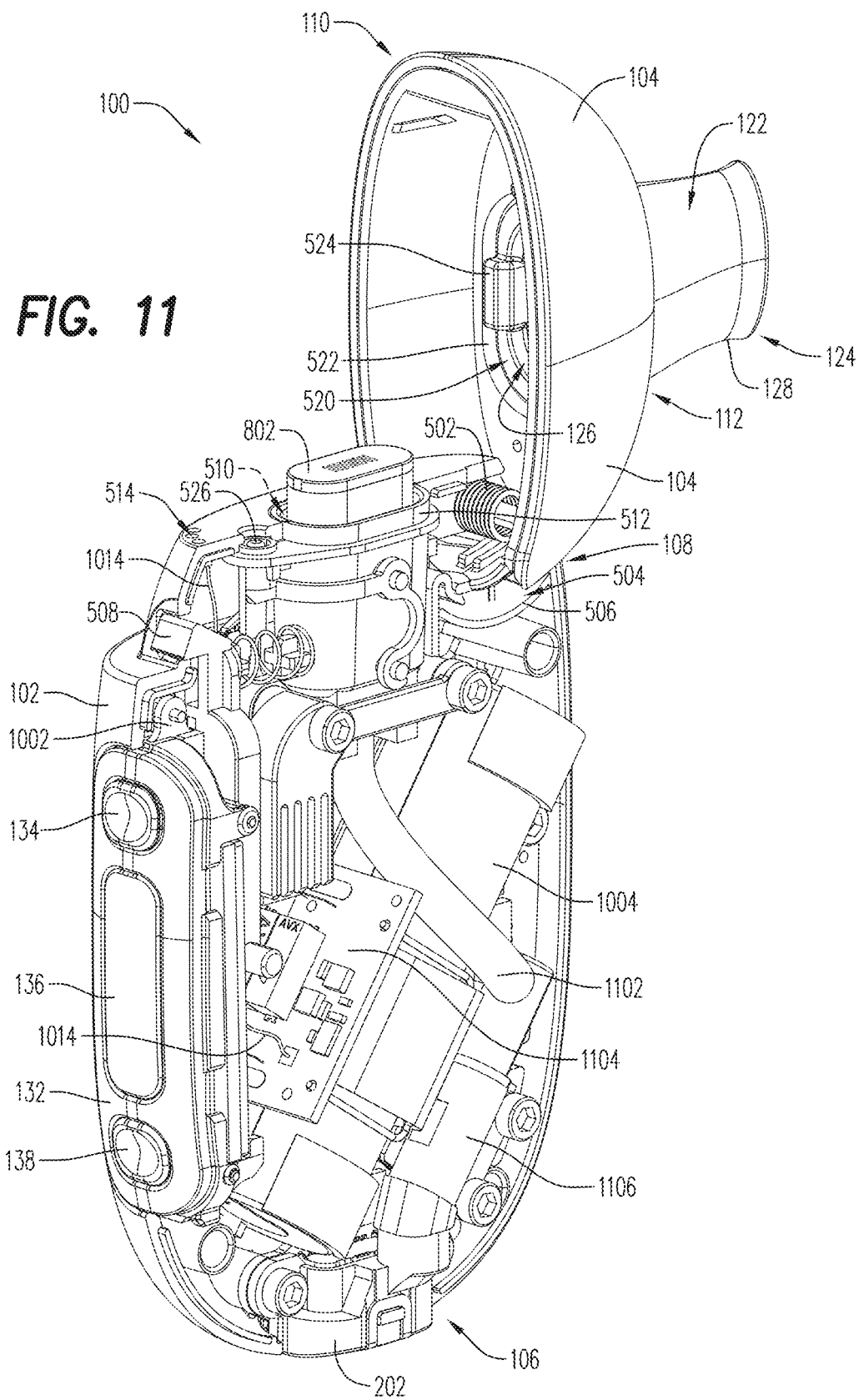
FIG. 11 is a partial front perspective view of the aerosol-generating device illustrated in FIG. 8, where a section of the housing has been removed.

Referring to FIG. 11, a partial, perspective view of the aerosol-generating device 100 is shown. A section of the housing 102 has been removed to show various internal components of the aerosol-generating device 100. In some embodiments, the housing 102 encases or houses an air hose 1102. The air hose 1102 may extend between and/or physically connect the capsule receiving cavity 510 to the plurality of pores 210. An air channel assembly 1104 may also be provided as an intermediary between the air hose 1102 and the plurality of pores 210. In such an instance, the air channel assembly 1104 may be configured to direct the incoming airflow (that is drawn in through the plurality of pores 210) to the air hose 1102. In some embodiments, the air channel assembly 1104 may include an airflow restrictor configured to provide optional control over the airflow through the aerosol-generating device 100. In some embodiments, one or more flow sensors 1106 may be disposed within or along the air channel assembly 1104 and/or along the air hose 1102. In at least one example embodiment, the one or more flow sensors 1106 includes a microelectromechanical system (MEMS) flow or pressure sensor or another type of sensor configure to measure air flow, such as a hot-wire anemometer. In at least one example embodiment, the one or more flow sensors 1106 may include pressure sensors, such as a capacitive pressure sensor, that are configured to measure a negative pressure during a draw event. In at least one example embodiment, the air channel assembly 1104 may omit the one or more flow sensors 1106.

Figure 12:
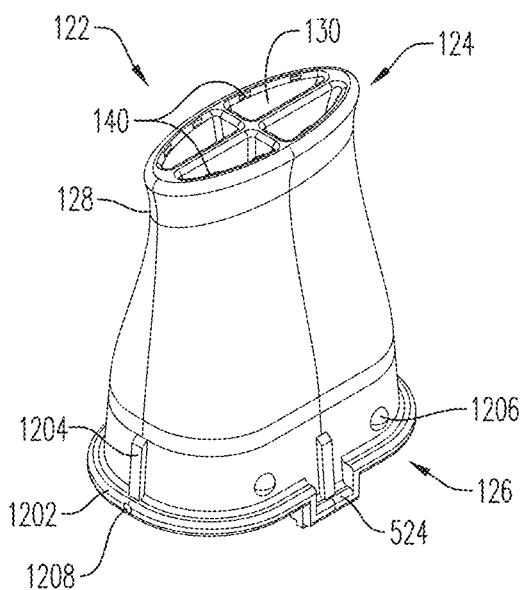
FIG. 12 is a top right, front perspective view of a mouthpiece in accordance with at least one example embodiment.
Figure 13:
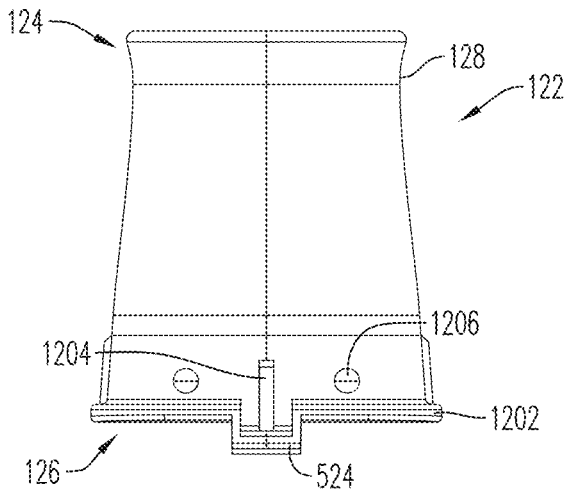
FIG. 13 is a front view of the mouthpiece illustrated in FIG. 12.
Figure 14:
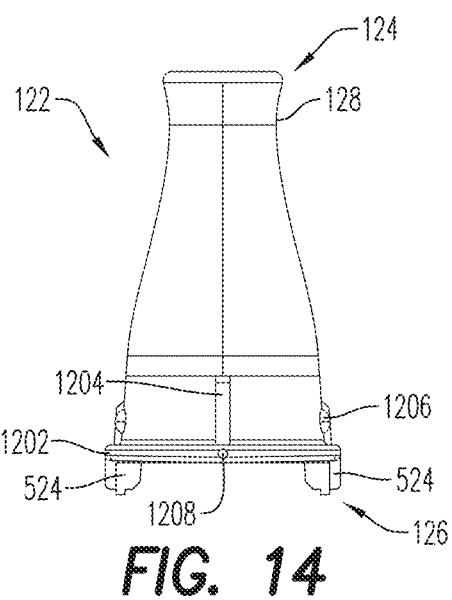
FIG. 14 is a first side view of the mouthpiece illustrated in FIG. 12.
Figure 15:
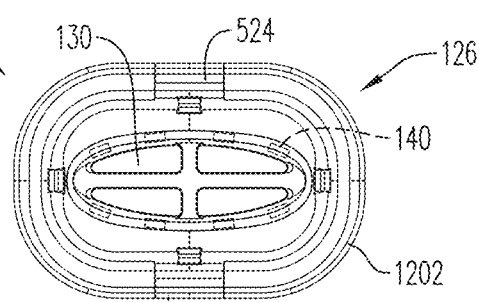
FIG. 15 is a bottom view of the mouthpiece illustrated in FIG. 12.
Figure 16:
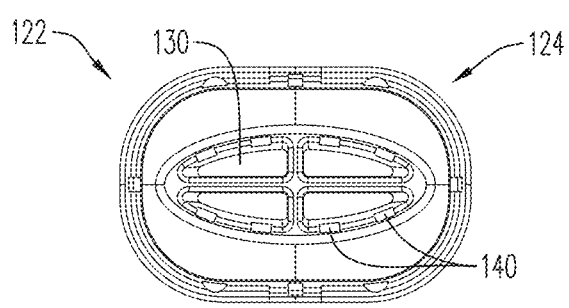
FIG. 16 is a top view of the mouthpiece illustrated in FIG. 12.

Referring to FIGS. 12-16, the mouthpiece 122 is shown from several different angles. FIG. 12 is a top right, front perspective view of the mouthpiece 122, FIG. 13 is a front view of the mouthpiece 122, FIG. 14 is a first side view of the mouthpiece 122, FIG. 15 is a bottom view of the mouthpiece 122, and FIG. 16 is a top view of the mouthpiece 122. The second end 126 of the mouthpiece 122 may include a ledge 1202, one or more ridges 1204, and one or more coupling structures 1206 that may be configured to position or align the mouthpiece 122 with respect to the lid 104. The one or more coupling structures 1206 may be bubble or projection couplers. For example, as illustrated, the mouthpiece 122 may include four bubble or projection couplers, two disposed along each major length of the second end 126 of the mouthpiece 122.

In some embodiments, the mouthpiece 122 may further include a contact point 1208 that may be disposed on the second end 126 of the mouthpiece 122. The contact point 1208 may be similar to the contact point on the second end 126 of the mouthpiece 122 as described above with reference to FIG. 10.

In some embodiments, the at least one UV light diode 140 may be directed from the one or more outlets 130 towards an interior of the mouthpiece 122. The at least one UV light diode may be configured to sterilize an interior of the mouthpiece 122 when the mouthpiece 122 is coupled to the lid 104 and when the at least one UV light diode 140 is actuated by the controller 1006.

Figure 17:
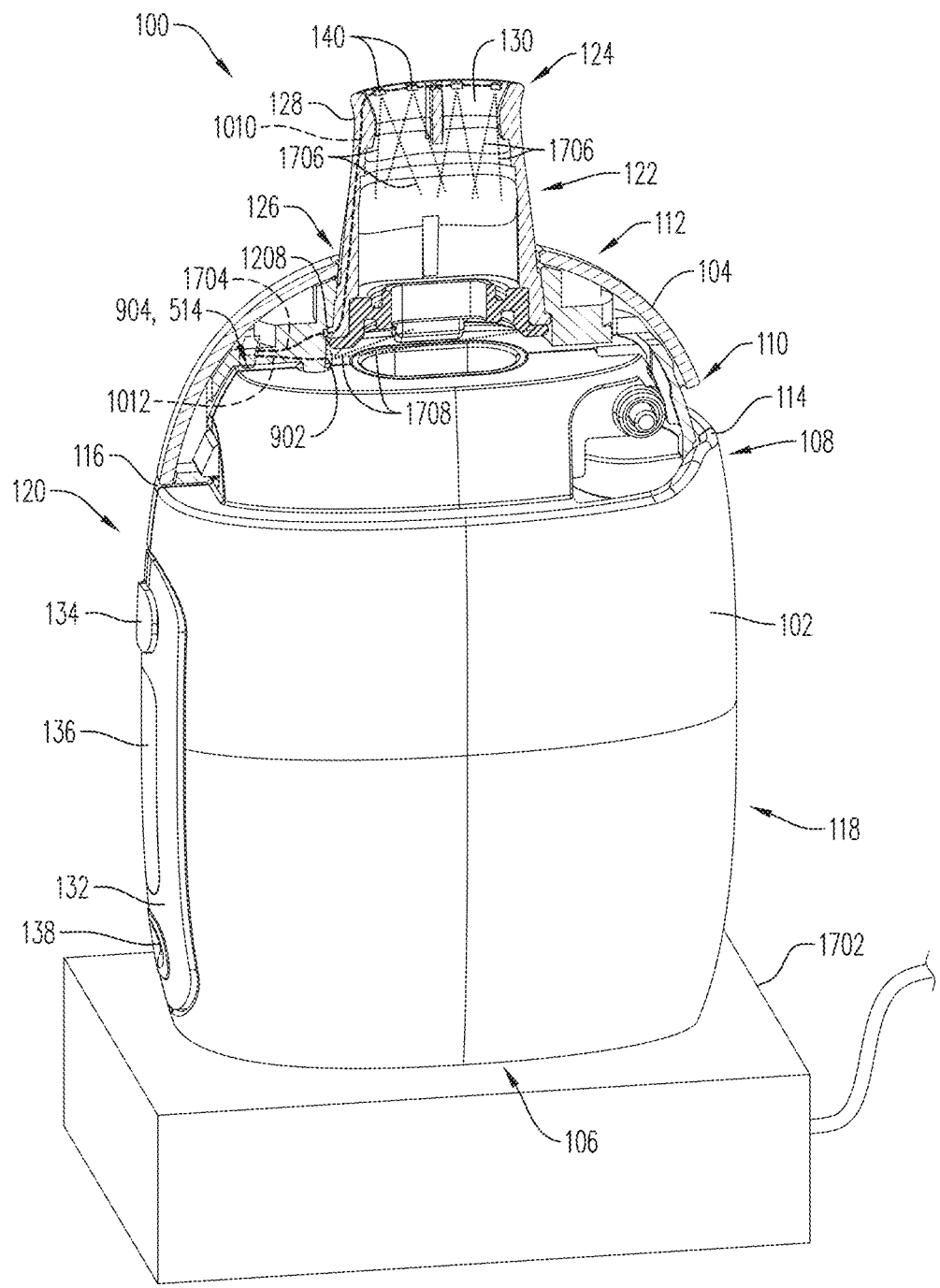
FIG. 17 is a partial cross-sectional view of the aerosol generating device of FIG. 1 in a sterilization mode while coupled to a charging station.

Referring to FIG. 17, the aerosol-generating device 100 is shown coupled to a charging station 1702 and the at least one UV light diode 140 and the second UV light diode 902 are actuated. When the aerosol-generating device 100 is used by an adult consumer, the adult consumer may place his or her mouth on the first end 124 of the mouthpiece 122 and breath or suck air through the mouthpiece 122. As a result of using the aerosol-generating device 100, exhaled air and saliva from the adult consumer may be introduced into the interior of the mouthpiece 122, the lid 104, and the housing 102. When the at least one UV light diode 140 and the second UV light diode 902 are actuated, any bacteria, mold, viruses, or other potentially harmful contaminants may be sterilized by the UV light emitted by the at least one UV light diode 140 and the second UV light diode 902.

As shown in FIG. 17, the first wire 1010 may couple the at least one UV light diode 140 to the contact point 1208. A fourth wire 1704 may couple the contact point 1208 to the at least one contact point 904. The fourth wire 1704 may be substantially similar to the first wire 1010, the second wire 1012, and/or the third wire 1014 described above. The second wire 1012 may couple the second UV light diode 902 to the at least one contact point 904. When the lid 104 is closed, the at least one contact point 904 may be coupled to the at least one communication point 514 of the housing 102. When the at least one contact point 904 is coupled to the at least one communication point 514, the controller 1006 may be coupled or may be in communication with the at least one UV light diode 140 and the second UV light diode 902.

In some embodiments, the first end 106 of the aerosol-generating device 100 may be configured to couple to the charging station 1702. For example, the port 202 may be received by the charging station 1702 in some embodiments. When the aerosol-generating device 100 is coupled to the charging station 1702, it may be in a non-use mode. When in the non-use mode, the controller 1006 may actuate the at least one UV light diode 140 and the second UV light diode 902.

When the at least one UV light diode 140 is actuated by a processing or control circuitry such as the controller 1006, it may emit UV light 1706 into an interior of the mouthpiece 122. When the at least one UV light diode 140 is a UV light ring diode, the UV light 1706 may be emitted from a plurality of UV light diodes such that an entirety of the interior of the mouthpiece 122 is sterilized by the UV light 1706. In some embodiments, the UV light 1706 may exit the second end 126 of the mouthpiece to enter the lid 104 and the housing 102 of the aerosol-generating device 100.

When the second UV light diode 902 is actuated by a processing or control circuitry such as a controller 1006, it may emit UV light 1708 within an interior of the lid 104 from the second end 112 of the lid 104 towards the first end 110 of the lid 104. The UV light 1708 may be directed towards the housing 102 such that the capsule 802 and the capsule receiving cavity 510 may be sterilized by the UV light 1708. In some embodiments, the capsule 802 may not be disposed within the capsule receiving cavity 510 when the aerosol-generating device 100 is coupled to the charging station 1702. When the capsule 802 is not within the capsule receiving cavity 510, the UV light 1708 may be emitted from the second UV light diode 902 and may reach an interior of the capsule receiving cavity 510 and may continue into an interior of the housing 102. The UV light 1708 may sterilize an interior of the lid 104 and the housing 102 that may be contacted by exhaled air or saliva of the adult consumer when the adult consumer is using the aerosol-generating device 100.

In some embodiments, the controller 1006 may be configured to operate the at least one UV light diode 140 and the second UV light diode 902 for a predetermined amount of time that is configured to sterilize the interior of the aerosol-generating device 100. The at least one UV light diode 140 and the second UV light diode 902 may turn off if the lid 104 is released from the housing 102 while the at least one UV light diode 140 or the second UV light diode 902 is actuated. Similarly, the at least one UV light diode 140 and the second UV light diode 902 may turn off if the aerosol-generating device 100 is removed from the charging station 1702 while the at least one UV light diode 140 or the second UV light diode 902 is actuated.

Figure 18:
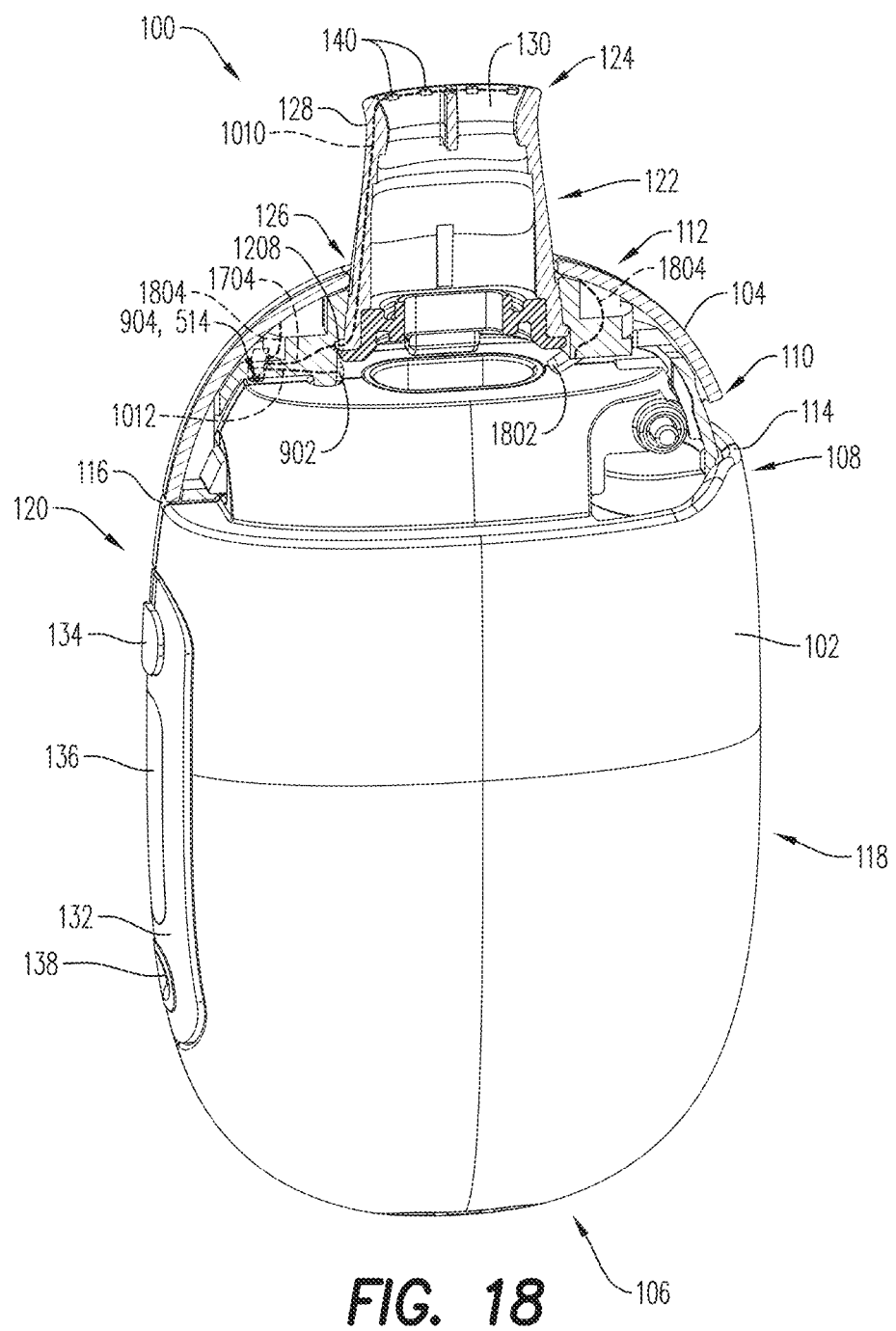
FIG. 18 is a partial cross-sectional view of another example embodiment of an aerosol generating device.

Referring to FIG. 18, another embodiment of the aerosol-generating device 100 is shown. In some embodiments, the aerosol-generating device 100 may include a third UV light diode 1802. The third UV light diode 1802 may be configured to direct UV light from the second end 112 of the lid 104 into an interior of the mouthpiece 122. In some embodiments, a fifth wire 1804 may be configured to couple the third UV light diode 1802 to the at least one contact point 904 of the lid 104. The fifth wire 1804 may be substantially similar to the first wire 1010, the second wire 1012, and/or the third wire 1014 described above. Similar to the at least one UV light diode 140 and the second UV light diode 902, the third UV light diode 1802 may be a UV-C diode. In some embodiments. The third UV light diode 1802 may be configured to emit UV light in a wavelength range of 100 nanometers to 280 nanometers.

Figure 19:
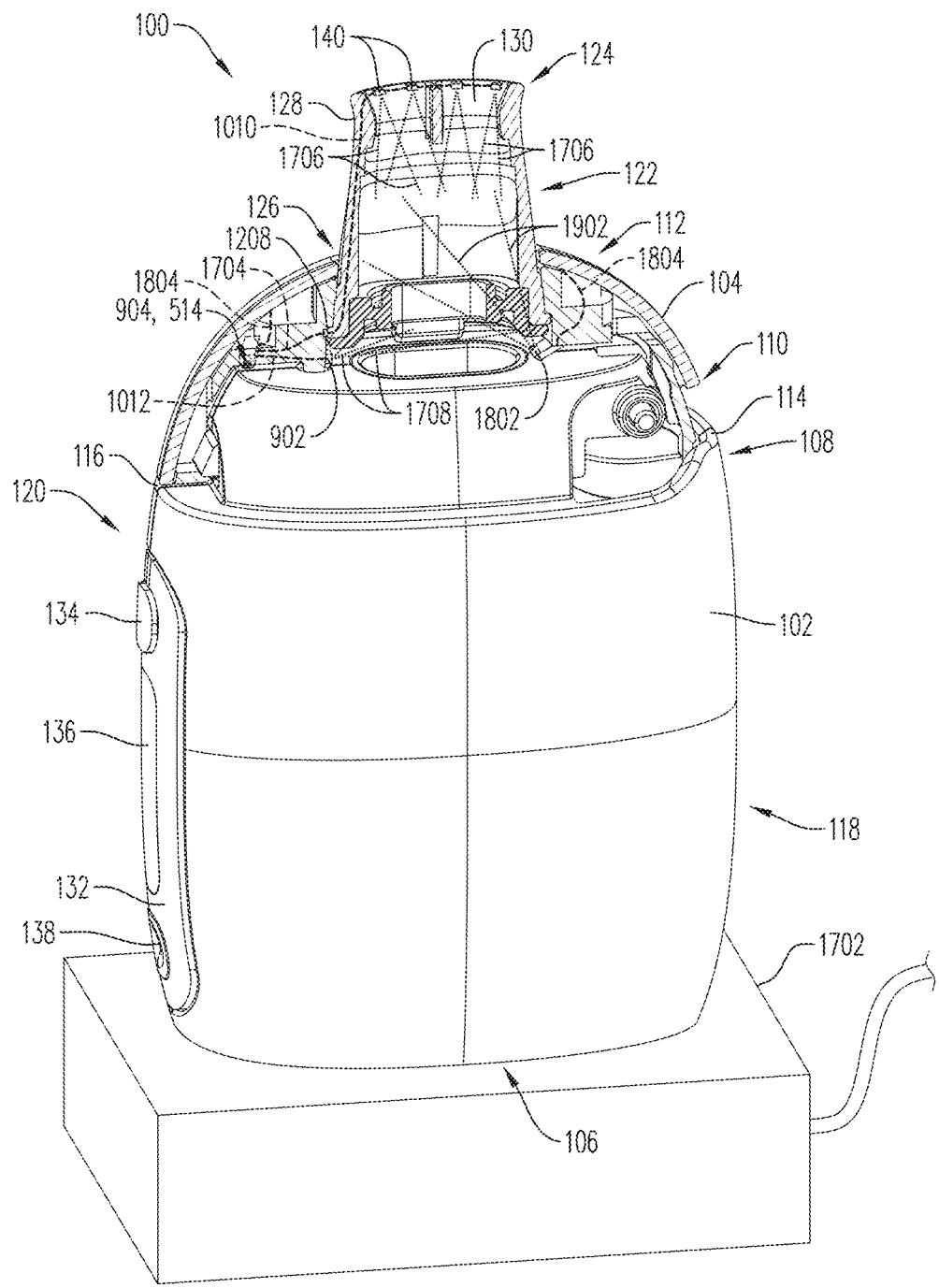
FIG. 19 is a partial cross-sectional view of the aerosol generating device of FIG. 18 in a sterilization mode while coupled to a charging station.

Referring to FIG. 19, the aerosol-generating device 100 of FIG. 18 is shown connected to the charging station 1702 with the at least one UV light diode 140, the second UV light diode 902, and the third UV light diode 1802 actuated. FIG. 19 may be substantially similar to FIG. 17 such that the first end 106 of the aerosol-generating device 100 may be configured to couple to the charging station 1702. When the aerosol-generating device 100 is coupled to the charging station 1702, it may be in a non-use mode. When in the non-use mode, the controller 1006 may actuate the at least one UV light diode 140, the second UV light diode 902, and the third UV light diode 1802.

When the at least one UV light diode 140 is actuated, it may emit UV light 1706 into an interior of the mouthpiece 122. When the at least one UV light diode 140 is a UV light ring diode, the UV light 1706 may be emitted from a plurality of UV light diodes such that an entirety of the interior of the mouthpiece 122 is sterilized by the UV light 1706. In some embodiments, the UV light 1706 may exit the second end 126 of the mouthpiece to enter the lid 104 and the housing 102 of the aerosol-generating device 100.

When the second UV light diode 902 is actuated, it may emit UV light 1708 within an interior of the lid 104 from the second end 112 of the lid 104 towards the first end 110 of the lid 104. The UV light 1708 may be directed towards the housing 102 such that the capsule 802 and the capsule receiving cavity 510 may be sterilized by the UV light 708. In some embodiments, the capsule 802 may not be disposed within the capsule receiving cavity 510 when the aerosol-generating device 100 is coupled to the charging station 1702. When the capsule 802 is not within the capsule receiving cavity 510, the UV light 1708 may be emitted from the second UV light diode 902 and may reach an interior of the capsule receiving cavity 510 and may continue into an interior of the housing 102. The UV light 1708 may sterilize an interior of the lid 104 and the housing 102 that may be contacted by exhaled air or saliva of the adult consumer when the adult consumer is using the aerosol-generating device 100.

When the third UV light diode 1802 is actuated, it may emit UV light 1902 from the second end 112 of the lid 104 towards the mouthpiece 122. The third UV light diode 1802 may be configured to sterilize the second end 112 of the lid and the second end 126 of the mouthpiece 122 proximate to where the mouthpiece 122 and the lid 104 couple together. In some embodiments, the UV light 1902 may enter the interior of the mouthpiece 122 and work with the UV light 1706 to sterilize the interior of the mouthpiece 122.

In some embodiments, the controller 1006 may be configured to operate the at least one UV light diode 140, the second UV light diode 902, and the third UV light diode 1802 for a predetermined amount of time that is configured to sterilize the interior of the aerosol-generating device 100. The at least one UV light diode 140, the second UV light diode 902, and the third UV light diode 1802 may turn off if the lid 104 is released from the housing 102 while the at least one UV light diode 140, the second UV light diode 902, or the third UV light diode 1802 is actuated. Similarly, the at least one UV light diode 140, the second UV light diode 902, and the third UV light diode 1802 may turn off if the aerosol-generating device 100 is removed from the charging station 1702 while the at least one UV light diode 140, the second UV light diode 902, or the third UV light diode 1802 is actuated.

Figure 20:
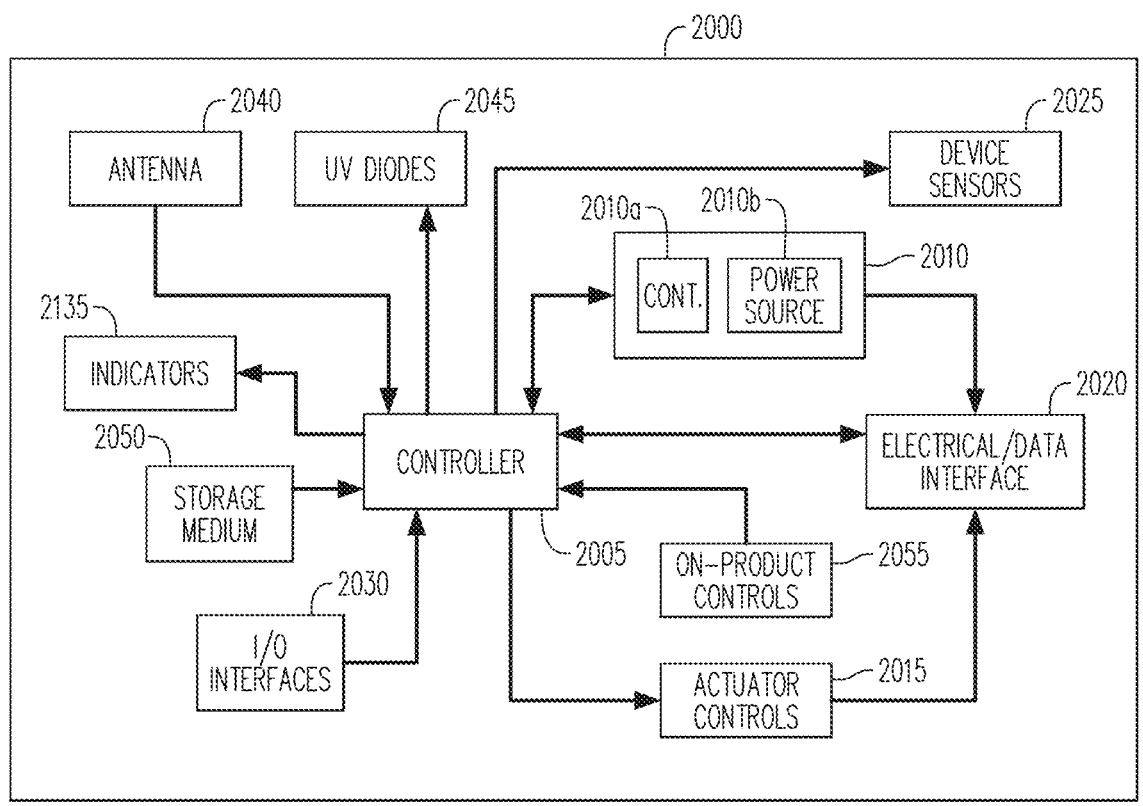
FIG. 20 is a block diagram of an aerosol-generating device according to an example embodiment.

Referring to FIG. 20, a block diagram of an aerosol-generating device according to an example embodiment is shown. In one instance, the aerosol-generating device may be the aerosol-generating device 100.

As shown in FIG. 20, according to at least one example embodiment, a control subsystem 2000 may include a controller 2005, a power supply 2010, actuator controls 2015, a capsule electrical/data interface 2020, device sensors 2025, input/output (I/O) interfaces 2030, aerosol indicators 2035, at least one antenna 2040, at least one UV diode 2045, and/or a storage medium 2050, etc., but the example embodiments are not limited thereto. For example, the control subsystem 2000 may include additional elements. However, for the sake of brevity, the additional elements are not described. In other example embodiments, the capsule electrical/data interface 2020 may be an electrical interface only, etc. In some embodiments, the capsule electrical/data interface 2020 may include the heater of the capsule.

The controller 2005 may be hardware including logic circuits; a hardware/software combination such as a processor executing software; or a combination thereof. For example, the controller 2005 may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In the event where the controller 2005 is, or includes, a processor executing software, the controller 2005 is configured as a special purpose machine (e.g., a processing device) to execute the software, stored in memory accessible by the controller 2005 (e.g., the storage medium 2050 or another storage device), to perform the functions of the controller 2005. The software may be embodied as program code including instructions for performing and/or controlling any or all operations described herein as being performed by the controller 2005.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

The controller 2005 communicates with the power supply 2010, the actuator control 2015, the capsule electrical/data interface 2020, the device sensors 2025, the input/output (I/O) interfaces 2030, the aerosol indicators 2035, the at least one UV diode 2045, on-product controls 2055, and/or the at least one antenna 2040, etc. According to at least some example embodiments, the on-product controls 2055 can include any device or devices capable of being manipulated manually by an adult operator to indicate a selection of a value. Example implementations include, but are not limited to, one or more buttons, a dial, a capacitive sensor, and a slider, etc.

The controller 2005 (or storage medium 2050) stores key material and proprietary algorithm software for the encryption. For example, encryption algorithms rely on the use of random numbers. The security of these algorithms depends on how truly random these numbers are. These numbers are usually pre-generated and coded into the processor or memory devices. Example embodiments may increase the randomness of the numbers used for the encryption by using the aerosol drawing parameters e.g., durations of instances of aerosol drawing, intervals between instances of aerosol drawing, or combinations of them, to generate numbers that are more random and more varying from individual to individual than pre-generated random numbers. All communications between the controller 2005 and the capsule 802 may be encrypted.

The controller 2005 is configured to operate a real time operating system (RTOS), control the control subsystem 2000 and may be updated through reading and/or sensing update information from a tag, chip, and/or label (e.g., a security tag, a security chip, etc.) included on the capsule 802, through communicating with the NVM or CC-NVM, and/or when the control subsystem 2000 is connected with other devices (e.g., a smart phone) through the I/O interfaces 2030 and/or the at least one antenna 2040. For example, the update information may include parameter information related to the corresponding capsule, such as heater parameter information and/or heater profile information tailored and/or directed towards the aerosol-forming substrate contained within the installed capsule 802, capsule authentication update information with information relevant to the capsule authentication method (e.g., security settings related to the capsules, updates to the security keys used during authentication, etc.), programming updates, etc. Additionally, the I/O interfaces 2030 and the at least one antenna 2040 allow the control subsystem 2000 to connect to various external devices such as smart phones, tablets, and PCs, etc. For example, the I/O interfaces 2030 may include a USB-C connector, a micro-USB connector, etc. The USB-C connector (e.g., port 202) may be used by the control subsystem 2000 to charge the power supply 2010 (e.g., which may correspond to the power source 1004), and may also be used to transmit and/or receive data from at least one external device, such as aerosol profiles, heater profiles, device performance log data (e.g., controller performance data, memory performance data, battery performance data, heater performance data, etc.), firmware upgrades, software upgrades, etc., but the example embodiments are not limited thereto.

The controller 2005 may include on-board RAM and flash memory to store and execute code including analytics, diagnostics and software upgrades. As an alternative, the storage medium 2050 may store the code. Additionally, in another example embodiment, the storage medium 2050 may be on-board the controller 2005.

The controller 2005 may further include on-board clock, reset and power management modules to reduce an area covered by a PCB in the device body housing.

The device sensors 2025 may include a number of sensor transducers that provide measurement information to the controller 2005. The device sensors 2025 may include a power supply temperature sensor, an external capsule temperature sensor, a current sensor for the heater, power supply current sensor, airflow sensor and an accelerometer to monitor movement and orientation. The power supply temperature sensor and external capsule temperature sensor may be a thermistor or thermocouple and the current sensor for the heater and power supply current sensor may be a resistive based sensor or another type of sensor configured to measure current. The air flow sensor (e.g., the flow sensors 1106) may be a pressure sensor (e.g., a capacitive pressure sensor, etc.) configured to detect positive or negative air pressure (e.g., a draw or a puff), a microelectromechanical system (MEMS) flow sensor, and/or another type of sensor configured to measure air flow such as a hot-wire anemometer. Further, instead of, or in addition to, measuring air flow using a flow sensor included in the device sensors 2025 of the control subsystem 2000 of the device body housing, air flow may be measured using a hot wire anemometer located in the capsule 802. According to at least one example embodiment, the device sensors 2025 further includes a capsule detection sensor for detecting the presence of the capsule 802 in the aerosol-generating device 100, and/or a lid detection sensor for detecting the closure of the lid 104 of the aerosol-generating device 100, but the example embodiments are not limited thereto.

The data generated from one or more of the device sensors 2025 may be detected based on a binary signal (e.g., on/off signal) using a general purpose input/output (GPIO) circuit, etc., and/or may be sampled at a sample rate appropriate to the parameter being measured using, for example, a discrete, multi-channel analog-to-digital converter (ADC), etc.

Additionally, according to at least one example embodiment, the device sensors may further include a tag sensor, such as a barcode sensor, a secure element (SE) reader, an optical reader, a physical parameter reader, etc. The tag sensor and/or the tag antenna (e.g., RFID antenna, NFC antenna, etc.) may be used individually or in combination to detect information stored on a tag (e.g., a RFID tag, a NFC tag, a barcode tag, a SE, etc.) installed and/or attached to an exterior portion of the capsule 802, and/or may be used to detect and/or sense a physical parameter of the capsule 802, such as a resistance value of a heater included within the capsule 802, etc. The tag sensor and/or tag antenna may be arranged in physical proximity to a properly inserted capsule 802 such that information stored on the tag, such as electronic identity information, authentication information, hardware parameter information, aerosol-forming substrate information (such as aerosol-forming substrate expiration information, date of manufacture information, etc.), profile information, etc.

The controller 2005 may adapt heater profiles for an aerosol-forming substrate and other profiles based on the measurement information received from the controller 2005. For the sake of convenience, these are generally referred to as aerosol profiles. The heater profile identifies the power profile to be supplied to the heater during the few seconds when aerosol drawing takes place and/or the power profile to be supplied to the heater in between aerosol drawing instances in order to apply continual heating to the capsule (e.g., to provide an "oven mode" where a desired temperature is maintained within the capsule for a desired period of time). For example, a heater profile can deliver maximum power to the heater when an instance of aerosol drawing is initiated, but then after a second or so immediately reduce the power to half way or a quarter way. According to at least some example embodiments, the modulation of electrical power provided to the heater may be implemented using pulse width modulation but is not limited thereto.

In addition, a heater profile can also be modified based on a detected draw and/or application of negative pressure on the aerosol-generating device 100. The use of the flow sensor allows aerosol drawing strength to be measured and used as feedback to the controller 2005 to adjust the power delivered to the heater of the capsule 802, which may be referred to as heating or energy delivery.

According to at least some example embodiments, when the controller 2005 recognizes the capsule 802 which is currently installed (e.g., via SKU, via a unique identifier included in a tag (e.g., RFID tag, NFC tag, etc.), etc.), the controller 2005 matches an associated heating profile that is designed for that particular capsule. The controller 2005 and the storage medium 2050 will store data and algorithms that allow the generation of heating profiles for all SKUs, capsule types, aerosol-forming substrate types, etc. In another example embodiment, the controller 2005 may read the heating profile from the capsule. Additionally, the adult operators may also adjust heating profiles to suit their preferences using the on-product controls 2055, using an external device wirelessly paired with the aerosol-generating device 100 and/or connected to the aerosol-generating device 100 via the I/O interfaces 2030, etc. In other example embodiments, the controller 2005 may use the heating profile applied for a previously installed capsule, which has been stored in memory, to a currently installed capsule on the assumption that the current capsule is of a same type as the previously installed capsule, etc.

The controller 2005 may send data to and receives data from the power supply 2010. The power supply 2010 includes a power source 2010*b* (e.g., which may correspond to the power source 1004) and a power controller 2010*a* to manage the power output by the power source 2010*b*.

The power source 2010*b* may be a Lithium-ion battery or one of its variants, for example a lithium-ion polymer battery. Alternatively, the power source 2010*b* may be a Nickel-metal hydride battery, a Nickel cadmium battery, a Lithium-manganese battery, a Lithium-cobalt battery or a fuel cell. Alternatively, the power source 2010*b* may be rechargeable and include circuitry allowing the battery to be chargeable by an external charging device. In that case, the circuitry, when charged, provides power for a desired (or alternatively a pre-determined) number of instances of aerosol drawing, after which the circuitry must be re-connected to an external charging device.

The power controller 2010*a* provides commands to the power source 2010*b* based on instructions from the controller 2005. For example, the power supply 2010 may receive a command from the controller 2005 to provide power to the capsule (through the capsule electrical/data interface 2020) when the capsule is detected and the adult operator activates the control subsystem 2000 (e.g., by activating a switch such as a toggle button, capacitive sensor, IR sensor). Additionally, according to some example embodiments, the controller 2005 may transmit the command to the power supply 2010 based on the proper authentication of the capsule, but the example embodiments are not limited thereto.

In addition to supplying power to the capsule, the power supply 2010 also supplies power to the controller 2005. Moreover, the power controller 2010*a* may provide feedback to the controller 2005 indicating performance of the power source 2010*b*.

The controller 2005 sends data to and receives data from the at least one antenna 2040. The at least one antenna 2040 may include a NFC modem and a Bluetooth Low Energy (LE) modem and/or other modems for other wireless technologies (e.g., WiFi, etc.). In an example embodiment, the communications stacks are in the modems, but the modems are controlled by the controller 2005. The Bluetooth LE modem is used for data and control communications with an application on an external device (e.g., smart phone, etc.). The NFC/Bluetooth LE/WiFi modem may be used for pairing of the aerosol-generating device 100 to the application and transmission of diagnostic information, data, profile information, capsule information, hardware parameter information, firmware updates, etc. Moreover, the Bluetooth LE/WiFi modem may be used to provide location information (for an adult operator to find the aerosol-generating device) or authentication during a purchase, etc.

In some embodiments, the controller 2005 may modify a wavelength of light emitted by the at least one UV diode 2045 based on data received from the at least one antenna 2040. For example, if a first wavelength is being emitted by the at least one UV diode 2045 and it is determined that a second wavelength would sterilize an interior of the aerosol-generating device better than the first wavelength, the at least one antenna 2040 may be used to receive this update and communicate that update with the controller 2005.

As described above, the control subsystem 2000 may generate and adjust various profiles for aerosol generation. The controller 2005 uses the power supply 2010 and the actuator controls 2015 to regulate the profile for the adult operator.

The actuator controls 2015 include passive and active actuators to regulate a desired aerosol profile. For example, the housing 102 may include actuators within an air inlet path and/or air inlet channel of the device body housing, such as within the air flow subsystem of the aerosol-generating device 100 (e.g., the air channel assembly 1104, the air hose 1102, etc.). The actuator controls 2015 may control the flow of air within the air inlet channel using the actuators based on commands from the controller 2005 associated with the desired aerosol profile.

Moreover, the actuator controls 2015 are used to energize the heater in conjunction with the power supply 2010. More specifically, the actuator controls 2015 are configured to generate a drive waveform associated with the desired aerosol profile. As described above, each possible profile is associated with a drive waveform. Upon receiving a command from the controller 2005 indicating the desired aerosol profile, the actuator controls 2015 may produce the associated modulating waveform for the power supply 2010.

The controller 2005 supplies information to the aerosol indicators 2035 to indicate statuses and occurring operations to the adult operator. The aerosol indicators 2035 include a power indicator displayed on the display panel (e.g., communication screen 136), a separate indicator light (e.g., a LED indicator light, etc.) that may be activated when the controller 2005 senses a button pressed by the adult operator. The aerosol indicators 2035 may also include a haptic feedback motor, a speaker, an indicator for a current state of an adult operator-controlled aerosol parameter (e.g., generated aerosol volume), and other feedback mechanisms.

Also described herein is a method of sanitizing an interior of the aerosol-generating device 100. The method can include placing the aerosol-generating device 100 in a non-use mode, actuating at least one UV diode, such as the at least one UV light diode 140. The second UV light diode 902, and/or the third UV light diode 1802, of the aerosol-generating device 100, and operating the at least one UV diode for a predetermined amount of time. In some example embodiments, placing the aerosol-generating device 100 into the non-use mode comprises can include placing the aerosol-generating device 100 onto a charging station to re-charge the aerosol-generating device 100. In some example embodiments, the predetermined amount of time can be an amount of time necessary to sanitize the interior of the aerosol-generating device 100. In some example embodiments the at least one UV diode can be turned off if the aerosol-generating device 100 is taken out of the non-use mode.

The systems, apparatuses, and methods described herein may provide significant advantages. For example, the aerosol-generating device 100 may enable internal sterilization of the aerosol-generating device 100 when the aerosol-generating device 100 is in a non-use mode. Sterilizing an interior of the aerosol-generating device 100 may help to eliminate adult consumer interaction with bacteria, mold, fungi, viruses, or other harmful contaminates that could be introduced into the aerosol-generating device 100 as a result of using the aerosol-generating device 100. Sterilizing an interior of the aerosol-generating device 100 may enable the aerosol-generating device 100 to remain cleaner which may improve an adult consumer's overall satisfaction with the aerosol-generating device 100 because an interior the aerosol-generating device 100 may be routinely sterilized without any work from the adult consumer.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. An aerosol-generating device comprising:
   a housing defining a capsule-receiving cavity;
   a lid configured to close the housing, the lid being fixedly coupled by a hinge to the housing at a first point and releasably couplable to the housing at a second point that is different from the first point;
   a mouthpiece couplable to the lid opposite the housing such that air entering the housing and drawn through the capsule-receiving cavity exits out of the mouthpiece, the mouthpiece including a first end and a second end opposite the first end, wherein the first end includes at least one outlet and the second end is configured to couple to the lid; and
   at least one UV diode configured to sanitize an interior of the aerosol-generating device when the at least one UV diode is actuated,
   wherein the at least one UV diode includes a plurality of UV diodes disposed on the first end of the mouthpiece and around the at least one outlet and the plurality of UV diodes are configured to direct UV light from the at least one outlet at the first end of the mouthpiece through the mouthpiece towards the lid.

2. The aerosol-generating device of claim 1, wherein the lid comprises an inner cavity configured to receive the capsule-receiving cavity when the lid is coupled to the housing at the second point.

3. The aerosol-generating device of claim 2, wherein the at least one UV diode includes a second UV diode within the inner cavity of the lid.

4. The aerosol-generating device of claim 3, wherein the second UV diode is directed towards the housing, the second UV diode configured to direct UV light towards the housing when the at least one UV diode is actuated.

5. The aerosol-generating device of claim 3, wherein the second UV diode is directed towards the mouthpiece, the second UV diode configured to direct UV light into the mouthpiece when the at least one UV diode is actuated.

6. The aerosol-generating device of claim 1, wherein the at least one UV diode further comprises a power contact, the power contact configured to contact an electrical connection of the housing when the lid is coupled to the housing at the second point.

7. The aerosol-generating device of claim 1, wherein the at least one outlet includes a plurality of outlets.

8. The aerosol-generating device of claim 1, wherein the at least one UV diode comprises a UV-C light ring diode including the plurality of UV diodes disposed on the first end of the mouthpiece and around the at least one outlet of the mouthpiece.

9. The aerosol-generating device of claim 8, wherein the UV-C light ring diode is configured to direct UV light into the mouthpiece when the UV-C light ring diode is actuated.

10. The aerosol-generating device of claim 1, further comprising a controller within the housing.

11. The aerosol-generating device of claim 10, wherein the controller is configured to actuate the plurality of UV diodes when the lid is coupled to the housing at the second point and the aerosol-generating device is in a non-use mode.

12. The aerosol-generating device of claim 11, wherein the aerosol-generating device is in the non-use mode when the aerosol-generating device is coupled to a charging station.

13. The aerosol-generating device of claim 11, wherein the plurality of UV diodes is configured to turn off if the aerosol-generating device is taken out of the non-use mode.

14. The aerosol-generating device of claim 11, wherein the controller is configured to operate the plurality of UV diodes for a predetermined amount of time.

15. The aerosol-generating device of claim 14, wherein the predetermined amount of time is an amount of time necessary to sanitize the interior of the aerosol-generating device.

16. The aerosol-generating device of claim 1, wherein the housing further comprises a communication screen and a power button.

17. The aerosol-generating device of claim 16, wherein the communication screen is configured to output information related to the plurality of UV diodes.

18. The aerosol-generating device of claim 1, wherein the plurality of UV diodes comprises UV-C diodes.

19. The aerosol-generating device of claim 1, wherein the plurality of UV diodes is configured to emit UV light in a wavelength range of 100 nanometers to 280 nanometers.

20. The aerosol-generating device of claim 12, wherein the plurality of UV diodes is configured to turn off if the aerosol-generating device is removed from the charging station.

* * * * *